(12) United States Patent
Kalinina et al.

(10) Patent No.: US 12,384,804 B2
(45) Date of Patent: Aug. 12, 2025

(54) COMPOSITION, FILM, DISPLAY DEVICE AND ARTICLE PREPARED THEREFROM, AND METHOD OF PREPARING ARTICLE

(71) Applicant: Samsung Electronics Co., Ltd., Suwon-si (KR)

(72) Inventors: Fedosya Kalinina, Hwaseong-si (KR); Hyeyoung Kong, Uijeongbu-si (KR); Byungha Park, Suwon-si (KR); Jungim Han, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 35 days.

(21) Appl. No.: 18/310,214

(22) Filed: May 1, 2023

(65) Prior Publication Data

US 2023/0265114 A1 Aug. 24, 2023

Related U.S. Application Data

(62) Division of application No. 17/530,534, filed on Nov. 19, 2021, now Pat. No. 11,639,361.

(30) Foreign Application Priority Data

Nov. 20, 2020 (KR) ......................... 10-2020-0156928

(51) Int. Cl.
*C07F 7/18* (2006.01)
*C08G 65/336* (2006.01)

(52) U.S. Cl.
CPC .......... *C07F 7/1892* (2013.01); *C08G 65/336* (2013.01); *C08G 2150/00* (2013.01)

(58) Field of Classification Search
CPC ........ C07F 7/0898; C07F 7/10; C07F 7/1892; C08G 65/336; C08G 2150/00
See application file for complete search history.

(56) References Cited

U.S. PATENT DOCUMENTS

| | | |
|---|---|---|
| 5,914,420 A | 6/1999 | Buese et al. |
| 7,323,514 B2 | 1/2008 | Jing et al. |
| 8,557,890 B2 | 10/2013 | Chang et al. |

(Continued)

FOREIGN PATENT DOCUMENTS

| | | |
|---|---|---|
| JP | 5987117 B2 | 9/2016 |
| KR | 1020070089976 A | 9/2007 |

(Continued)

OTHER PUBLICATIONS

D. Kim et al., 138 Journal of the American Chemical Society, 15106-15109 (2018) (Year: 2018).*
P. de Gennes, 57 Reviews of Modern Physics, 827-863 (1985) (Year: 1985).*
ASTM Designation D7334-08, Standard Practice for Surface Wettability of Coatings, Substrates and Pigments by Advancing Contact Angle Measurement (2013) (Year: 2013).*
Y. Ma et al., 48 Polymer, 7455-7460 (2007) (Year: 2007).*
N. Adamczyk et al., 24 Langmuir, 2081-2089 (2008) (Year: 2008).*
Y.Pan, et al., Surface-Triggered Tandem Coupling Reactions of Cyclic Azasilanes. Y.Pan, A.Maddox, T. Min, F. Gonzaga, J. Goff, B. Arkles. Chem. Asian J. 2017, 12, 1198-1203.
Alain E. Kaloyeros et al., Emerging Molecular and Atomic Level Techniques for Nanoscale Applications. Alain E. Kaloyeros, Jonathan Goff, and Barry Arkles. Electrochem. Soc. Interface, 27 (2018), pp. 59-63.
Byproduct-Free Synthesis, Characterization, and Reactivity of 1, 2-Diaminosiloxane Monolayers on Silicon/Silicon Dioxide. K.Khadka, G. K. Carpenter IV,G.S. Ferguson. Chemistry Select 2019, 4, 11801-11807.

(Continued)

*Primary Examiner* — Alexander R Pagano
(74) *Attorney, Agent, or Firm* — CANTOR COLBURN LLP

(57) ABSTRACT

A composition, a film, a display device and article prepared therefrom, and a method of preparing the article, the composition including: a compound having a fluorine-containing (poly)ether group represented by Formula 1; and a heteroatom-containing cyclic silane compound represented by Formula 2 or 3:

Formula 1

$$Rf-(L1)_{p1}-Q1$$

Formula 2

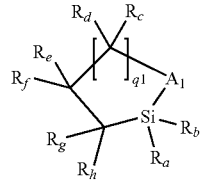

Formula 3

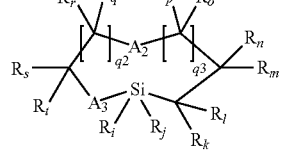

wherein, in Formulas 1 to 3,
Rf is a fluorine-containing (poly)ether group, and
$L1$, $Q1$, $p1$, $q1$, $q2$, $q3$, $A1$, $A2$, $A3$, $R_a$, $R_b$, $R_i$, $R_j$, $R_c$, $R_d$, $R_e$, $R_f$, $R_g$, $R_h$, $R_k$, $R_l$, $R_m$, $R_n$, $R_o$, $R_p$, $R_q$, $R_r$, $R_s$, and $R_t$ are as described in the detailed description.

19 Claims, 2 Drawing Sheets

(56) References Cited

U.S. PATENT DOCUMENTS

| | | | |
|---|---|---|---|
| 10,082,607 B2 | 9/2018 | Su et al. | |
| 11,639,361 B2 * | 5/2023 | Kalinina | C07F 7/1892 |
| | | | 556/413 |
| 2007/0232822 A1 | 10/2007 | Arkles et al. | |
| 2010/0084574 A1 * | 4/2010 | Brassell | B05D 7/20 |
| | | | 250/492.1 |
| 2010/0114274 A1 * | 5/2010 | Dowling | C08L 83/04 |
| | | | 607/116 |
| 2012/0262790 A1 * | 10/2012 | Su | B82Y 40/00 |
| | | | 977/890 |
| 2013/0033753 A1 * | 2/2013 | Su | B05D 1/60 |
| | | | 359/581 |
| 2013/0189495 A1 | 7/2013 | Fu et al. | |
| 2016/0075841 A1 * | 3/2016 | Zupancich | C08J 7/0427 |
| | | | 525/477 |
| 2017/0106129 A1 | 4/2017 | Sutton et al. | |
| 2018/0030071 A1 * | 2/2018 | Arkles | C07F 7/10 |
| 2019/0127580 A1 | 5/2019 | Osada et al. | |
| 2021/0054149 A1 | 2/2021 | Kim et al. | |
| 2021/0261738 A1 | 8/2021 | Park et al. | |
| 2021/0261813 A1 | 8/2021 | Han et al. | |
| 2022/0184658 A1 | 6/2022 | Ham et al. | |

FOREIGN PATENT DOCUMENTS

| | | | | |
|---|---|---|---|---|
| KR | 101050650 B1 | 7/2011 | | |
| WO | 2003091186 A2 | 11/2003 | | |
| WO | WO-03091186 A2 * | 11/2003 | | C07F 7/10 |
| WO | WO-2008045953 A2 * | 4/2008 | | A61L 27/26 |
| WO | 2011076924 A1 | 6/2011 | | |

OTHER PUBLICATIONS

D. Kim et al, 138 Journal of the American Chemical Society, 15106-15109 (2016) (Year: 2016).

M. Buese et al., 42 Polymer Preprints, 174-175 (2001) (Year: 2001).

Susan H. Tilford, et al., Cyclic Azasilanes and Cyclic Thiasilanes for Nano-Surface Modification. S.H. Tilford, B. Arkles , J. Goff., Speciality Chemicals Magazine 37.Dec. 6, 2017. www.specchemonline.com.

Wolfgang Ziche, et al., Synthesis and Structure of 1,6-Diaza-2,2-Dimethoxy-2-Silacyclooctane, Journal of Organometallic Chemistry (1996), 521(1-2), 29-31.

Y. Pan et al., 12 Chemistry an Asian Journal, 1198-1203 (2017) (Year: 2017).

Z. Wang et al., 9 RSC Advances, 31013-31020 (2019) (Year: 2019).

\* cited by examiner

COMPOSITION, FILM, DISPLAY DEVICE AND ARTICLE PREPARED THEREFROM, AND METHOD OF PREPARING ARTICLE

CROSS-REFERENCE TO RELATED APPLICATION

This application is a divisional application of U.S. patent application Ser. No. 17/530,534, filed on Nov. 19, 2021, which is based on and claims priority to Korean Patent Application No. 10-2020-0156928, filed on Nov. 20, 2020, in the Korean Intellectual Property Office, and all the benefits accruing therefrom under 35 U.S.C. § 119, the entire contents of which are incorporated by reference herein.

BACKGROUND

1. Field

The present disclosure relates to a composition, a film, a display device and an article prepared therefrom, and a method of preparing the article.

2. Description of the Related Art

A portable electronic device, such as a smartphone or a tablet PC, may include a functional layer having a variety of functions.

Nowadays, touch screen panels configured to recognize a contact position of a finger or a tool are becoming widespread.

To improve the slipperiness and the touch feeling of a surface of a touch screen panel, a functional layer is applied to a surface of a display panel.

However, functionality of such a functional layer may be deteriorated by continuous or repeated contacts of a finger or a tool with the functional layer.

SUMMARY

An aspect provides a composition having improved durability by having a novel composition.

Another aspect provides a film prepared from the composition.

Still another aspect provides a display device comprising the film prepared from the composition.

Still another aspect provides an article comprising the film prepared from the composition.

Still another aspect provides a method for preparing the article.

Additional aspects will be set forth in part in the description which follows and, in part, will be apparent from the description, or may be learned by practice of the presented embodiments of the disclosure.

According to an aspect, provided is a composition including:

a compound having a fluorine-containing (poly)ether group, wherein the compound is represented by Formula 1; and a heteroatom-containing cyclic silane compound represented by Formula 2 or Formula 3:

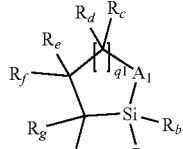

Formula 1

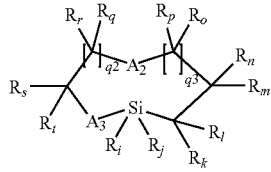

Formula 2

Formula 3 wherein, in Formulas 1 to 3,

Rf is a fluorine-containing (poly)ether group,

L1 is a substituted or unsubstituted C1 to C20 alkylene group, a substituted or unsubstituted C1 to C20 oxyalkylene group, or a combination thereof, Q1 is —C(═O)O—$R_1$, —C(═O)—O—C(═O)—$R_2$, —O—(C═O)—$CR_3$═$CR_4R_5$, —O—(C═O)—$CR_6$═$CR_7$—(C═O)—O—$R_8$, —O—C(═O)—O—$R_9$, an epoxy-containing group, or a cyclic carbonate-containing group, p1 is an integer of 1 to 10, q1, q2, and q3 are each independently an integer of 1 to 10, A1, A2, and A3 are each independently ═N—$R_u$ or —S—, $R_1$, $R_2$, $R_5$, $R_8$, and $R_9$ are each independently a substituted or unsubstituted C1 to C20 alkyl group, or a substituted or unsubstituted C6 to C20 aryl group, $R_3$, $R_4$, $R_6$, and $R_7$ are each independently a hydrogen, a halogen atom, a hydroxy group, a substituted or unsubstituted C1 to C20 alkyl group, or a substituted or unsubstituted C6 to C20 aryl group, $R_a$, $R_b$, $R_i$, and $R_j$ are each independently a substituted or unsubstituted C1 to C20 alkoxy group, a substituted or unsubstituted C1 to C20 alkyl group, a substituted or unsubstituted C6 to C20 aryl group, a halogen, or a hydroxy group, and $R_c$, $R_d$, $R_e$, $R_f$, $R_g$, $R_h$, $R_k$, $R_l$, $R_m$, $R_n$, $R_o$, $R_p$, $R_q$, $R_r$, $R_s$, $R_t$, and $R_u$ are each independently a hydrogen, a substituted or unsubstituted C1 to C20 alkyl group, a substituted or unsubstituted C6 to C20 aryl group, or a substituted or unsubstituted C2 to C20 alkenyl group.

According to another aspect, provided is a film including:

a ring-opening reaction product of a compound represented by Formula 2 or Formula 3, a compound including a ring-opening reaction product of the compound represented by Formula 2 or Formula 3, and the fluorine-containing (poly)ether group represented by Formula 1, or a polycondensation product of a ring-opening reaction product of the heteroatom-containing cyclic silane compound represented by Formula 2 or 3, a compound having a fluorine-containing (poly)ether group represented by Formula 1, or a combination thereof:

Formula 1

Rf—(L1)$_{p1}$—Q1

3
-continued

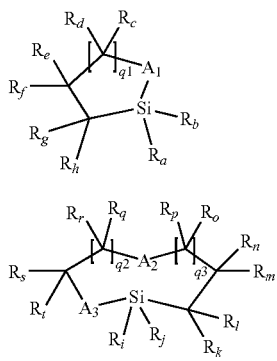

Formula 2

Formula 3 wherein, in Formulas 1 to 3,
Rf is a fluorine-containing (poly)ether group,
L1 is a substituted or unsubstituted C1 to C20 alkylene group, a substituted or unsubstituted C1 to C20 oxyalkylene group, or a combination thereof,
Q1 is —C(=O)O—$R_1$, —C(=O)—O—C(=O)—$R_2$, —O—(C=O)—$CR_3$=$CR_4R_5$, —O—(C=O)—$CR_6$=$CR_7$—(C=O)—O—$R_8$, —O—C(=O)—O—$R_9$, an epoxy-containing group, or a cyclic carbonate-containing group,
p1 is an integer of 1 to 10,
q1, q2, and q3 are each independently an integer of 1 to 10,
A1, A2, and A3 are each independently =N—$R_u$ or —S—,
$R_1$, $R_2$, $R_5$, $R_8$, and $R_9$ are each independently a substituted or unsubstituted C1 to C20 alkyl group, or a substituted or unsubstituted C6 to C20 aryl group,
$R_3$, $R_4$, $R_6$, and $R_7$ are each independently a hydrogen, a halogen atom, a hydroxy group, a substituted or unsubstituted C1 to C20 alkyl group, or a substituted or unsubstituted C6 to C20 aryl group,
$R_a$, $R_b$, $R_i$, and $R_j$ are each independently a substituted or unsubstituted C1 to C20 alkoxy group, a substituted or unsubstituted C1 to C20 alkyl group, a substituted or unsubstituted C6 to C20 aryl group, halogen, or a hydroxy group, and
$R_c$, $R_d$, $R_e$, $R_f$, $R_g$, $R_h$, $R_k$, $R_l$, $R_m$, $R_n$, $R_o$, $R_p$, $R_q$, $R_r$, $R_s$, $R_t$, and $R_u$ are each independently a hydrogen, a substituted or unsubstituted C1 to C20 alkyl group, a substituted or unsubstituted C6 to C20 aryl group, or a substituted or unsubstituted C2 to C20 alkenyl group.
According to another aspect, provided is a display device including:
a film including a ring-opening reaction product of a compound represented by Formula 2 or Formula 3,
a film including a compound including a ring-opening reaction product of the compound represented by Formula 2 or Formula 3, and the fluorine-containing (poly)ether group represented by Formula 1, or
a film including a polycondensation product of a ring-opening reaction product of the compound represented by Formula 2 or Formula 3, a compound having a fluorine-containing (poly)ether group represented by Formula 1, or a combination thereof:

Rf—(L1)$_{p1}$—Q1     Formula 1

4
-continued

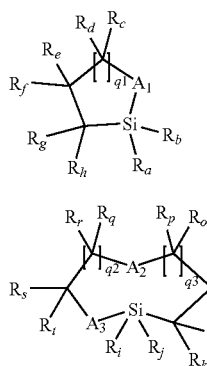

Formula 2

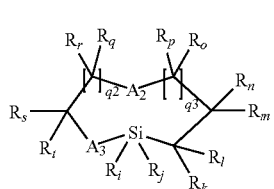

Formula 3 wherein, in the above formulas,
Rf is a fluorine-containing (poly)ether group,
L1 is a substituted or unsubstituted C1 to C20 alkylene group, a substituted or unsubstituted C1 to C20 oxyalkylene group, or a combination thereof,
Q1 is —C(=O)O—$R_1$, —C(=O)—O—C(=O)—$R_2$, —O—(C=O)—$CR_3$=$CR_4R_5$, —O—(C=O)—$CR_6$=$CR_7$—(C=O)—O—$R_8$, —O—C(=O)—O—$R_9$, an epoxy-containing group, or a cyclic carbonate-containing group,
p1 is an integer of 1 to 10,
q1, q2, and q3 are each independently an integer of 1 to 10,
A1, A2, and A3 are each independently represent =N—$R_u$ or —S—,
$R_1$, $R_2$, $R_5$, $R_8$, and $R_9$ are each independently a substituted or unsubstituted C1 to C20 alkyl group, or a substituted or unsubstituted C6 to C20 aryl group,
$R_3$, $R_4$, $R_6$, and $R_7$ are each independently a hydrogen, a halogen atom, a hydroxy group, a substituted or unsubstituted C1 to C20 alkyl group, or a substituted or unsubstituted C6 to C20 aryl group,
$R_a$, $R_b$, $R_i$, and $R_j$ are each independently a substituted or unsubstituted C1 to C20 alkoxy group, a substituted or unsubstituted C1 to C20 alkyl group, a substituted or unsubstituted C6 to C20 aryl group, a halogen, or a hydroxy group, and
$R_c$, $R_d$, $R_e$, $R_f$, $R_g$, $R_h$, $R_k$, $R_l$, $R_m$, $R_n$, $R_o$, $R_p$, $R_q$, $R_r$, $R_s$, $R_t$, and $R_u$ are each independently a hydrogen, a substituted or unsubstituted C1 to C20 alkyl group, a substituted or unsubstituted C6 to C20 aryl group, or a substituted or unsubstituted C2 to C20 alkenyl group.
According to still another aspect, provided is an article including:
a substrate; and
a film disposed on the substrate, wherein
the film includes
a ring-opening reaction product of a compound represented by Formula 2 or Formula 3,
a compound including a ring-opening reaction product of the compound represented by Formula 2 or Formula 3, the fluorine-containing (poly)ether group represented by Formula 1, or a combination thereof, or
a polycondensation product of a ring-opening reaction product of the compound represented by Formula 2 or Formula 3, a compound having a fluorine-containing (poly)ether group represented by Formula 1, or a combination thereof:

$$Rf-(L1)_{p1}-Q1 \quad \text{Formula 1}$$

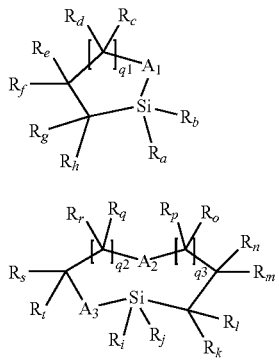

Formula 2

Formula 3 wherein, in Formulas 1 to 3,
Rf is a fluorine-containing (poly)ether group,
L1 is a substituted or unsubstituted C1 to C20 alkylene group, a substituted or unsubstituted C1 to C20 oxyalkylene group, or a combination thereof,
Q1 is $-C(=O)O-R_1$, $-C(=O)-O-C(=O)-R_2$, $-O-(C=O)-CR_3=CR_4R_5$, $-O-(C=O)-CR_6=CR_7-(C=O)-O-R_8$, $-O-C(=O)-O-R_9$, an epoxy-containing group, or a cyclic carbonate-containing group,
p1 is an integer of 1 to 10,
q1, q2, and q3 are each independently an integer of 1 to 10,
A1, A2, and A3 are each independently $=N-R_u$ or $-S-$,
$R_1$, $R_2$, $R_5$, $R_8$, and $R_9$ are each independently a substituted or unsubstituted C1 to C20 alkyl group, or a substituted or unsubstituted C6 to C20 aryl group,
$R_3$, $R_4$, $R_6$, and $R_7$ are each independently a hydrogen, a halogen atom, a hydroxy group, a substituted or unsubstituted C1 to C20 alkyl group, or a substituted or unsubstituted C6 to C20 aryl group,
$R_a$, $R_b$, $R_i$, and $R_j$ are each independently a substituted or unsubstituted C1 to C20 alkoxy group, a substituted or unsubstituted C1 to C20 alkyl group, a substituted or unsubstituted C6 to C20 aryl group, a halogen, or a hydroxy group, and
$R_c$, $R_d$, $R_e$, $R_f$, $R_g$, $R_h$, $R_k$, $R_l$, $R_m$, $R_n$, $R_o$, $R_p$, $R_q$, $R_r$, $R_s$, $R_t$, and $R_u$ are each independently a hydrogen, a substituted or unsubstituted C1 to C20 alkyl group, a substituted or unsubstituted C6 to C20 aryl group, or a substituted or unsubstituted C2 to C20 alkenyl group.

According to still another aspect, provided is a method for preparing an article, the method including:
applying the composition onto the substrate to place a film thereon.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
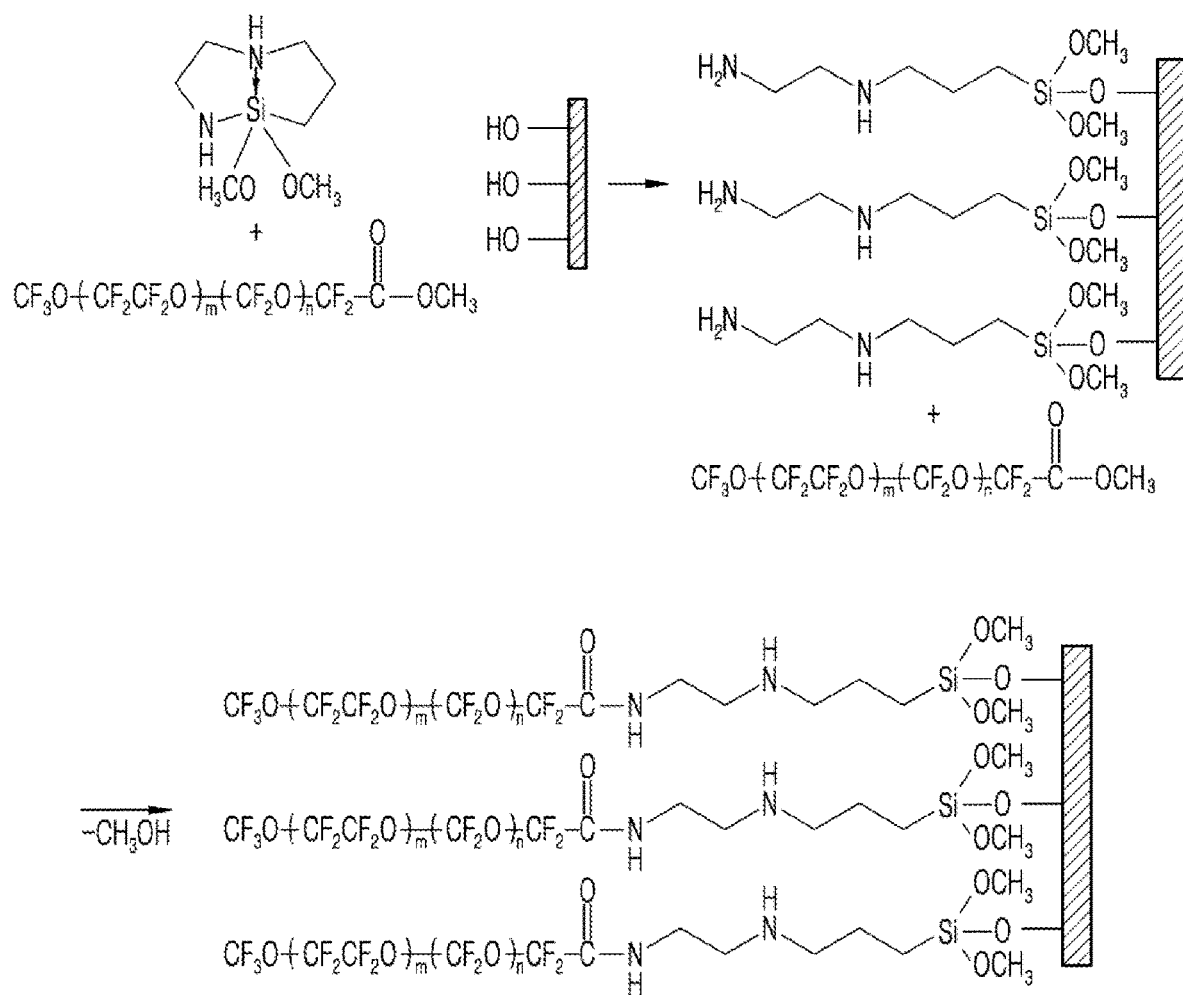
FIG. 1 is a schematic view for explaining a structure of a film formed on a substrate from a composition according to an embodiment, and a mechanism for forming the same.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list, for example, "at least one of a, b, or c" indicates only a, only b, only c, both a and b, both a and c, both b and c, all of a, b, and c, or variations thereof.

Various example embodiments are shown in the accompanying drawings. The present inventive concept may, however, be embodied in many different forms and should not be construed as limited to the example embodiments set forth herein. Rather, these example embodiments are provided so that this disclosure will be thorough and complete, and will fully convey the scope of the present inventive concept to those skilled in the art. Like numerals refer to like elements throughout.

It will be understood that when an element is referred to as being "on" another element, it can be directly on the other element or intervening elements may be present. In contrast, when an element is referred to as being "directly on" another element, there are no intervening elements.

It will be understood that, although the terms first, second, third etc. may be used herein to describe various elements, components, regions, layers and/or sections, these elements, components, regions, layers and/or sections, should not be limited by these terms. These terms are only used to distinguish one element component, region, layer and/or section, from another. Thus, a first element, component, region, layer and/or section, discussed below could be termed a second element, component, region, layer and/or section, without departing from the teachings of the present inventive concept The terminology used herein is for the purpose of describing particular example embodiments only and is not intended to be limiting of the present inventive concept. The terminology used herein is for the purpose of describing particular embodiments only and is not intended to be limiting. As used herein, the singular forms are intended to include the plural forms including "at least one" as well, unless the context clearly indicates otherwise. In addition, a phrase "at least one" should not be construed as limited to be singular. As used herein, the term "or" means "and/or," the term "and/or" includes any and all combinations of one or more of the associated list items. It will be further understood that the terms "includes," "have," "comprises" "including," "having," and/or "comprising," when used in this specification, specify the presence of stated features, integers, steps, operations, elements, and/or components, but do not preclude the presence or addition of one or more other features, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Example embodiments of inventive concepts are described herein with reference to cross-sectional illustrations that are schematic illustrations of idealized embodiments of example embodiments. As such, variations from the shapes of the illustrations as a result, for example, of manufacturing techniques and/or tolerances, are to be expected. Thus, example embodiments of inventive concepts should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present description and claims.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±20%, 10%, 5% of the stated value.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

Hereinafter, a composition according to an embodiment, a film, display device and article prepared therefrom, and a method for preparing the article will be described in further detail.

Composition

A composition according to an embodiment includes: a compound having a fluorine-containing (poly)ether group, wherein the compound is represented by Formula 1; and a heteroatom-containing cyclic silane compound represented by Formula 2 or Formula 3:

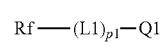
Formula 1

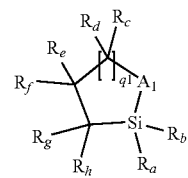
Formula 2

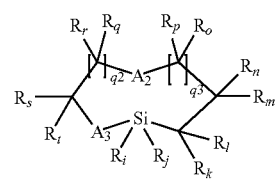
Formula 3 wherein, in the above formulas,

Rf is a fluorine-containing (poly)ether group,

L1 is a substituted or unsubstituted C1 to C20 alkylene group, a substituted or unsubstituted C1 to C20 oxyalkylene group, or a combination thereof, Q1 is $-C(=O)O-R_1$, $-C(=O)-O-C(=O)-R_2$, $-O-(C=O)-CR_3=CR_4R_5$, $-O-(C=O)-CR_6=CR_7-(C=O)-O-R_8$, $-O-C(=O)-O-R_9$, an epoxy-containing group, or a cyclic carbonate-containing group, p1 is an integer of 1 to 10, q1, q2, and q3 are each independently an integer of 1 to 10, A1, A2, and A3 are each independently $=N-R_u$ or $-S-$, $R_1$, $R_2$, $R_5$, $R_8$, and $R_9$ are each independently a substituted or unsubstituted C1 to C20 alkyl group, or a substituted or unsubstituted C6 to C20 aryl group, $R_3$, $R_4$, $R_6$, and $R_7$ are each independently a hydrogen, a halogen atom, a hydroxy group, a substituted or unsubstituted C1 to C20 alkyl group, or a substituted or unsubstituted C6 to C20 aryl group, $R_a$, $R_b$, $R_i$, and $R_j$ are each independently a substituted or unsubstituted C1 to C20 alkoxy group, a substituted or unsubstituted C1 to C20 alkyl group, a substituted or unsubstituted C6 to C20 aryl group, a halogen, or a hydroxy group, and $R_c$, $R_d$, $R_e$, $R_f$, $R_g$, $R_h$, $R_k$, $R_l$, $R_m$, $R_n$, $R_o$, $R_p$, $R_q$, $R_r$, $R_s$, $R_t$, and $R_u$ are each independently a hydrogen, a substituted or unsubstituted C1 to C20 alkyl group, a substituted or unsubstituted C6 to C20 aryl group, or a substituted or unsubstituted C2 to C20 alkenyl group.

In the compound having a fluorine-containing (poly)ether group, wherein the compound is represented by Formula 1, at least one of $R_a$ and $R_b$ may be, for example, a substituted or unsubstituted C1 to C20 alkoxy group, a halogen, or a hydroxy group.

In the heteroatom-containing cyclic silane compound represented by Formula 2 or Formula 3, at least one of $R_i$ and $R_j$ may be, for example, a substituted or unsubstituted C1 to C20 alkoxy group, a halogen, or a hydroxy group.

The composition including the compound having a fluorine-containing (poly)ether group, wherein the compound is represented by Formula 1 and the heteroatom-containing cyclic silane compound represented by Formula 2 or Formula 3 may be used as a material for coating a surface of a substrate. When a coating film is formed on a surface of a display, the display surface may be abraded due to a contact of a finger, etc., with the passage of time, thereby lowering durability of the display. Since the composition includes both of the compound having a fluorine-containing (poly) ether group represented by Formula 1 and the heteroatom-containing cyclic silane compound represented by Formula 2 or Formula 3, in the course of forming a coating film, the heteroatom-containing cyclic silane compound is bonded to a polar functional group, such as a hydroxy group, of a substrate through a ring-opening reaction even without water. At the same time, the composition may form a heteroatom-containing terminal functional group, and the heteroatom-containing terminal functional group may function as a catalyst a hydrolysis and/or polycondensation reaction of the compound having a fluorine-containing (poly)ether group, or may be used as a reactant in a hydrolysis and/or polycondensation reaction of the compound having a fluorine-containing (poly)ether group. In an embodiment, a coating film which is more solid and has improved durability can be obtained.

Since the inside of a chamber is under vacuum, for example, in deposition or coating, the chamber is substantially in an anhydrous condition. It is difficult to carry out a hydrolysis and/or polycondensation reaction on the substrate surface by the compound having a fluorine-containing (poly)ether group, which has been vaporized inside the chamber, to a perform the hydrolysis and/or polycondensation reaction on the substrate surface by the compound having a fluorine-containing (poly)ether group. The efficiency of the hydrolysis reaction and/or the polycondensation reaction on the substrate surface is lowered during deposition or coating by using only the compound having a fluorine-containing (poly)ether group. Therefore, the durability of the coating film obtained through the hydrolysis reaction and/or polycondensation reaction may also be lowered. However, by using the composition including not only the compound having a fluorine-containing (poly)ether group but also the heteroatom-containing cyclic silane compound, the heteroatom-containing cyclic silane compound is bound to the surface of the substrate through a ring-opening reaction even in an anhydrous condition. The heteroatom-containing cyclic silane compound has a ring strain and is capable of easily forming a bond with a hydrophilic functional group on a substrate even without water.

In an embodiment, the compound produced through a ring-opening reaction of the heteroatom-containing cyclic silane compound includes a heteroatom-containing terminal functional group at a side opposite to the substrate. The heteroatom-containing terminal functional group, e.g., an amine group and/or thiol group, involves in the hydrolysis reaction and/or polycondensation reaction of the compound having a fluorine-containing (poly)ether group as a catalyst and/or a reactant. Therefore, the efficiency of the hydrolysis reaction and/or polycondensation reaction of the compound having a fluorine-containing (poly)ether group may be noticeably improved. Consequently, the durability of the obtained coating film is improved.

In an embodiment, the compound produced by the hydrolysis and/or polycondensation reaction of the compound produced through a ring-opening reaction of the heteroatom-containing cyclic silane compound represented by Formula 2 or Formula 3 and the compound produced by the hydrolysis and/or polycondensation reaction of the compound having a fluorine-containing (poly)ether group represented by Formula 1 includes a linking group capable of forming a non-covalent interaction with adjacent molecules between the fluorine-containing (poly)ether moiety and the silane group. The compounds prepared from the composition through the above-described reactions firmly maintain inter-chain interactions, and thus reduce or prevent damage and/or destruction of the bonding of the coating film due to frequent frictions. In an embodiment, the surface coating film may not be easily worn away due to the frequent frictions but may have reinforced durability. More specifically, since a non-covalent interaction, for example, a hydrogen bond, is maintained between a non-covalent electron pair of an amino group or an amide group included in the compound produced by the hydrolysis reaction and/or the polycondensation reaction of a ring-opening reaction product of the heteroatom-containing cyclic silane compound represented by Formula 2 or Formula 3 and the compound having a fluorine-containing (poly)ether group, wherein the compound is represented by Formula 1, and a hydrogen atom of an amide group included in an adjacent compound, a coating film prepared from the composition may have further improved durability.

By being used on a surface of a panel provided in a display device, the composition including a compound having a fluorine-containing (poly)ether group according to an embodiment and a heteroatom-containing cyclic silane compound may provide water repellency and an anti-fingerprint function and may provide improved wear resistance and durability. The panel provided in a display device may be, for example, a touch screen panel provided in a portable terminal, a panel provided in a liquid display device (LCD), or a panel provided in a plasma display panel (PDP).

Referring to FIG. 1, a film is formed on a substrate by coating the composition including a compound having a fluorine-containing (poly)ether group, wherein the compound is represented by Formula 1, and a heteroatom-containing cyclic silane compound represented by Formula 2 or Formula 3, is coated on a surface of the substrate. The heteroatom-containing cyclic silane compound represented by Formula 2 or Formula 3 is a compound containing a heteroatom and having a silane group. Since the cyclic silane compound has a ring strain, a ring-opening reaction may be carried out at room temperature even without water. The ring-opening reaction can be carried out at a temperature of about 40° C. or less, about 35° C. or less, or about 30° C. or less. The ring-opening reaction can be carried out at a temperature of about 0° C. to about 40° C., about 10° C. to about 35° C., or about 20° C. to about 30° C. Therefore, the silane group included in the cyclic silane compound is bonded to a substrate or an underlying layer having a polar functional group, such as a hydroxy group, through a ring-opening reaction without a hydrolysis reaction, thereby forming a monolayer, and there is no harmful byproduct generated due to hydrolysis. That is, the composition of the present invention is distinguished from the composition requiring a high temperature of about 50° C. to about 120° C. or water to be bonded to the substrate.

In an embodiment, the silane group included in the heteroatom-containing cyclic silane compound may not include a hydrolytic group. Even if a hydrolytic group is included in the silane group, the silane group included in the heteroatom-containing cyclic silane compound may easily form a bond on the substrate or the underlying layer by the ring strain, as described herein, The silane not including a hydrolytic group may be, for example, a silane substituted by a substituted or unsubstituted C1 to C20 alkyl group, or a substituted or unsubstituted C6 to C20 aryl group. In another example, the silane group may be a silane substituted by at least one hydrolytic group. By being substituted by a hydrolytic group, the silane group may be more easily bonded to the substrate or the underlying layer. The silane substituted by at least one hydrolytic group may be, for example, a silane substituted by at least one substituted or unsubstituted C1 to C20 alkoxy group, a halogen atom or a hydroxy group. During coating or deposition, the hydrolytic silane group may be bonded to a substrate or an underlying layer through a hydrolysis and/or polycondensation reaction. The bonding may be, for example, a covalent bond. By including a hydrolysable group, a hydrolytic silane group may be subjected to a hydrolysis and/or polycondensation reaction during coating of a composition, thereby forming a network including a hydrolysis product and/or a polycondensation product of silane. The hydrolysable group may include, for example, a C1-C10 alkoxy group, a halogen atom, or a hydroxy group, and examples thereof may include a C1-C8 alkoxy group, such as a methoxy group or an ethoxy group. Specifically, the methoxy group has excellent hydrolytic reactivity.

The silane group is bonded to a substrate or an underlying layer by a ring-opening reaction of the heteroatom-containing cyclic silane compound, and a heteroatom-containing functional group is disposed at an opposite side (i.e., an atmosphere side) to the substrate or the underlying layer. The heteroatom-containing functional group may be, for example, an amine group or a thiol group. The compound represented by Formula 1 is linked to the heteroatom-containing functional group through a hydrolysis and/or polycondensation reaction. The compound represented by Formula 1, for example, has a perfluoroether(poly)ether (PFPE) group as the fluorine-containing (poly)ether group, and a functional group having reactivity with respect to the heteroatom-containing functional group is linked to the PFPE group. Examples of the functional group having reactivity with respect to the heteroatom-containing functional group may include, but not limited to, an ester group, an acrylate group, an epoxy group, a malate group, an anhydride group, a cyclic carbonate group, or any suitable functional group capable of reacting with the heteroatom-containing functional group may be suitably used.

The compound produced by linking the compound represented by Formula 1 to the heteroatom-containing functional group derived from a heteroatom-containing cyclic silane compound through the hydrolysis and/or polycondensation reaction includes, for example, an amide bond. In an embodiment, a hydrogen bond is formed between amide bonds included in the produced compounds, and thus the compounds each including an amide bond may be more firmly bonded to each other. Therefore, a film formed from such a composition may have further improved abrasion resistance.

The compound represented by Formula 1 may be, for example, a compound represented by Formula 4:

    Formula 4 wherein, in Formula 4, $Rf_a$ is a C1 to C20 perfluoroalkyl group, $Lf_b$ is a (poly)oxyalkylene group including a fluorine-containing C1 to C5 alkylene group, L1 is a substituted or unsubstituted C1 to C20 alkylene group, a substituted or unsubstituted C1 to C20 oxyalkylene group, or a combination thereof, Q1 is —C(=O)O—$R_1$, —C(=O)—O—C(=O)—$R_2$, —O—(C=O)—$CR_3$=$CR_4R_5$, —O—(C=O)—$CR_6$=$CR_7$—(C=O)—O—$R_8$, —O—C(=O)—O—$R_9$, an epoxy-containing group, or a cyclic carbonate-containing group, p2 is an integer of 1 to 10, $R_1$, $R_2$, $R_5$, $R_8$, and $R_9$ are each independently a substituted or unsubstituted C1 to C20 alkyl group, or a substituted or unsubstituted C6 to C20 aryl group, and $R_3$, $R_4$, $R_6$, and $R_7$ are each independently a hydrogen, a halogen atom, a hydroxy group, a substituted or unsubstituted C1 to C20 alkyl group, or a substituted or unsubstituted C6 to C20 aryl group.

In the compound represented by Formula 4, Lfb is a (poly)oxyalkylene group including one or more eating units of the formula —CFXO—, —CFXCFXO—, —CF2CF2CF2O—, —CF2CF2CF2CF2O—, or —CF2CF2CF2CF2CF2O—, the number of repeating units is, for example, 2 to 510, 2 to 410, 2 to 310, 2 to 210, or 2 to 110 2 to 510, and X is, for example, Cl, Br, or I.

In the compounds represented by Formulas 1 and 4, for example, $Rf_a$ is perfluoroether or perfluoropolyether.

The fluorine-containing (poly)ether groups included in the compounds represented by Formulas 1 and 4 may have a structure in which a $CF_3O$ group, a $CF_3CF_2O$ group, or a $CF_3CF_2CF_2O$ group, for example, is present at ends thereof, and —$(CF_2CF_2O)_m$— and —$(CF_2O)_n$— are bound to the $CF_3O$ group, the $CF_3CF_2O$ group, or the $CF_3CF_2CF_2O$ group, regardless of order. m and n are each independently an integer of, for example, 1 to 110, 5 to 100, 10 to 80, 10 to 70, 10 to 50, or 10 to 40, and m+n is in a range of, for example, 2 to 210, 2 to 200, 2 to 150, 5 to 100, or 10 to 50.

The fluorine-containing (poly)ether groups included in the compounds represented by Formulas 1 and 4 may have a structure in which a $CF_3O$ group, a $CF_3CF_2O$ group, or a $CF_3CF_2CF_2O$ group, for example, is present at ends thereof, and —$(CF_2CF_2O)_m$—, —$(CF_2O)_{n1}$—, and —$(CF_2CF_2CF_2O)_{n2}$— are bound to the $CF_3O$ group, the $CF_3CF_2O$ group, or the $CF_3CF_2CF_2O$ group, regardless of order. m, n1, and n2 are each independently an integer of, for example, 1 to 110, 5 to 100, 10 to 80, 10 to 70, 10 to 50, or 10 to 40, and m+n1+n2 is in a range of, for example, 3 to 310, 3 to 300, 3 to 250, 3 to 200, 5 to 150, 10 to 110, or 10 to 50.

The fluorine-containing (poly)ether groups included in the compounds represented by Formulas 1 and 4 may have a structure in which a $CF_3O$ group, a $CF_3CF_2O$ group, or a $CF_3CF_2CF_2O$ group is present at ends thereof, and —$(CF_2CF_2O)_m$—, —$(CF_2O)_{n1}$—, —$(CF_2CF_2CF_2O)_{n2}$—, and —$(CF_2CF_2CF_2CF_2O)_{n3}$— are bound to the $CF_3O$ group, the $CF_3CF_2O$ group, or the $CF_3CF_2CF_2O$ group, regardless of order. m, n1, n2, and n3 are each independently an integer of, for example, 1 to 110, 5 to 100, 10 to 80, 10 to 70, 10 to 50, or 10 to 40, and m+n1+n2+n3 is in a range of, for example, 4 to 410, 4 to 400, 4 to 350, 4 to 300, 4 to 250, 4 to 200, 5 to 150, 10 to 110, or 10 to 50.

The fluorine-containing (poly)ether groups included in the compounds represented by Formulas 1 and 4 have a structure in which a $CF_3O$ group, a $CF_3CF_2O$ group, or a $CF_3CF_2CF_2O$ group is present at ends thereof, and —$(CF_2CF_2O)_m$—, —$(CF_2O)_{n1}$—, —$(CF_2CF_2CF_2O)_{n2}$—, —$(CF_2CF_2CF_2CF_2O)_{n3}$— and —$(CF_2CF_2CF_2CF_2CF_2O)_{n4}$— are bound to the $CF_3O$ group, the $CF_3CF_2O$ group, or the $CF_3CF_2CF_2O$ group, regardless of order. Regardless of order, m, n1, n2, n3, and n4 are each independently an integer of, for example, 1 to 110, 5 to 100, 10 to 80, 10 to 70, 10 to 50, or 10 to 40, m+n1+n2+n3+n4 is in a range of, for example, 5 to 510, 5 to 500, 5 to 450, 5 to 400, 5 to 350, 5 to 300, 5 to 250, 5 to 200, 5 to 150, 10 to 110, or 10 to 50.

The Rf included in the compounds represented by Formulas 1 and 4 may be, for example,

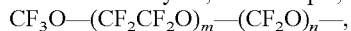
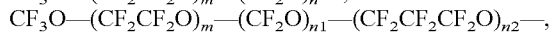

$CF_3O-(CF_2CF_2O)_m-(CF_2O)_{n1}-(CF_2CF_2CF_2O)_{n2}-(CF_2CF_2CF_2CF_2O)_{n3}-$, $CF_3O-(CF_2CF_2O)_m-(CF_2O)_{n1}-(CF_2CF_2CF_2O)_{n2}-(CF_2CF_2CF_2CF_2O)_{n3}-(CF_2CF_2CF_2CF_2CF_2O)_{n4}-$, $CF_3CF_2O-(CF_2CF_2O)_m-(CF_2O)_n-$, $CF_3CF_2O-(CF_2CF_2O)_m-(CF_2O)_{n1}-(CF_2CF_2CF_2O)_{n2}-$, $CF_3CF_2O-(CF_2CF_2O)_m-(CF_2O)_{n1}-(CF_2CF_2CF_2O)_{n2}-(CF_2CF_2CF_2CF_2O)_{n3}-$, $CF_3CF_2O-(CF_2CF_2O)_m-(CF_2O)_{n1}-(CF_2CF_2CF_2O)_{n2}-(CF_2CF_2CF_2CF_2O)_{n3}-(CF_2CF_2CF_2CF_2CF_2O)_{n4}-$, $CF_3CF_2CF_2O-(CF_2CF_2O)_m-(CF_2O)_n-$, $CF_3CF_2CF_2O-(CF_2CF_2O)_m-(CF_2O)_{n1}-(CF_2CF_2CF_2O)_{n2}-$, $CF_3CF_2CF_2O-(CF_2CF_2O)_m-(CF_2O)_{n1}-(CF_2CF_2CF_2O)_{n2}-(CF_2CF_2CF_2CF_2O)_{n3}-$, or $CF_3CF_2CF_2O-(CF_2CF_2O)_m-(CF_2O)_{n1}-(CF_2CF_2CF_2O)_{n2}-(CF_2CF_2CF_2CF_2O)_{n3}-(CF_2CF_2CF_2CF_2CF_2O)_{n4}-$.

wherein m, n1, n2, n3, and n4 are each independently an integer of, for example, 1 to 110, 5 to 100, 10 to 80, 10 to 70, 10 to 50, or 10 to 40. m+n is in a range of, for example, 2 to 210, 2 to 200, 2 to 150, 5 to 100, or 10 to 50. m+n1+n2 is in a range of, for example, 3 to 310, 3 to 300, 3 to 250, 3 to 200, 5 to 150, 10 to 110, or 10 to 50. m+n1+n2+n3 is in a range of, for example, 4 to 410, 4 to 400, 4 to 350, 4 to 300, 4 to 250, 4 to 200, 5 to 150, 10 to 110, or 10 to 50. m+n1+n2+n3+n4 is in a range of, for example, 5 to 510, 5 to 500, 5 to 450, 5 to 400, 5 to 350, 5 to 300, 5 to 250, 5 to 200, 5 to 150, 10 to 110, or 10 to 50.

The compounds represented by Formulas 1 and 4 may include, for example, one or more of an ester compound represented by Formulas 5a and 5b, an anhydride compound represented by Formulas 5c and 5d, an acrylate compound represented by Formulas 5e and 5f, a maleate compound represented by Formulas 5g and 5h, a carbonate compound represented by Formulas 5i and 5j, an epoxy compound represented by Formulas 5k and 5l, and a cyclic carbonate compound represented by Formulas 5m and 5n:

$CF_3O-(CF_2CF_2O)_m-(CF_2O)_n-(CR_{12}R_{13})_{p3}-C(=O)O-R_1$     Formula 5a $CF_3O-(CF_2CF_2O)_m-(CF_2O)_n-(CR_{14}R_{15}CR_{16}R_{17})_{p3}-C(=O)O-R_1$     Formula 5b $CF_3O-(CF_2CF_2O)_m-(CF_2O)_n-(CR_{12}R_{13})_{p3}-C(=O)-O-C(=O)-R_2$     Formula 5c $CF_3O-(CF_2CF_2O)_m-(CF_2O)_n-(CR_{14}R_{15}CR_{16}R_{17})_{p3}-C(=O)-O-C(=O)-R_2$     Formula 5d $CF_3O-(CF_2CF_2O)_m-(CF_2O)_n-(CR_{12}R_{13})_{p3}-O-(C=O)-CR_3=CR_4R_5$     Formula 5e $CF_3O-(CF_2CF_2O)_m-(CF_2O)_n-(CR_{14}R_{15}CR_{16}R_{17})_{p3}-O-(C=O)-CR_3=CR_4R_5$     Formula 5f $CF_3O-(CF_2CF_2O)_m-(CF_2O)_n-(CR_{12}R_{13})_{p3}-O-(C=O)-CR_6=CR_7-(C=O)-O-R_8$     Formula 5g $CF_3O-(CF_2CF_2O)_m-(CF_2O)_n-(CR_{14}R_{15}CR_{16}R_{17})_{p3}-O-(C=O)-CR_6=CR_7-(C=O)-O-R_8$     Formula 5h $CF_3O-(CF_2CF_2O)_m-(CF_2O)_n-(CR_{12}R_{13})_{p3}-O-C(=O)-O-R_9$     Formula 5i $CF_3O-(CF_2CF_2O)_m-(CF_2O)_n-(CR_{14}R_{15}CR_{16}R_{17})_{p3}-O-C(=O)-O-R_9$     Formula 5j $CF_3O-(CF_2CF_2O)_m-(CF_2O)_n-(CR_{12}R_{13})_{p3}-R_{10}$     Formula 5k $CF_3O-(CF_2CF_2O)_m-(CF_2O)_n-(CR_{14}R_{15}CR_{16}R_{17})_{p3}-R_{10}$     Formula 5l $CF_3O-(CF_2CF_2O)_m-(CF_2O)_n-(CR_{12}R_{13})_{p3}-R_{11}$     Formula 5m $CF_3O-(CF_2CF_2O)_m-(CF_2O)_n-(CR_{14}R_{15}CR_{16}R_{17})_{p3}-R_{11}$     Formula 5n wherein, in the above formulas, $R_{10}$ and $R_{11}$ are each independently a hydrogen, a C1 to C5 alkyl group, fluorine, or a fluorinated C1 to C5 alkyl group, m and n are each independently an integer of 1 to 110, m+n is in a range of 2 to 210, p3 is in a range of 1 to 10, $R_1$, $R_2$, $R_5$, $R_8$, and $R_9$ are each independently a substituted or unsubstituted C1 to C20 alkyl group, or a substituted or unsubstituted C6 to C20 aryl group, $R_3$, $R_4$, $R_6$, $R_7$, $R_{12}$, $R_{13}$, $R_{14}$, $R_{15}$, $R_{16}$, and $R_{17}$ are each independently a hydrogen, a halogen atom, a hydroxy group, a substituted or unsubstituted C1 to C20 alkyl group, or a substituted or unsubstituted C6 to C20 aryl group, $R_{10}$ is

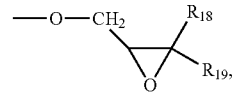

$R_{11}$ is

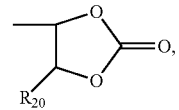

$R_{18}$, $R_{19}$, and $R_{20}$ are each independently a hydrogen, a halogen atom, a hydroxy group, a substituted or unsubstituted C1 to C20 alkyl group, or a substituted or unsubstituted C6 to C20 aryl group.

The compounds represented by Formulas 1 and 4 may include, for example, $CF_3O-(CF_2CF_2O)_m-(CF_2O)_n-(CF_2)_{p3}-C(=O)O-CH_3$, $CF_3O-(CF_2CF_2O)_m-(CF_2O)_n-(CF_2)_{p3}-C(=O)O-CH_2CH_3$, $CF_3O-(CF_2CF_2O)_m-(CF_2O)_n-(CF_2)_{p3}-C(=O)O-CH_2CH_2CH_3$, $CF_3O-(CF_2CF_2O)_m-(CF_2O)_n-(CF_2CH_2)_{p3}-C(=O)O-CH_3$, $CF_3O-(CF_2CF_2O)_m-(CF_2O)_n-(CF_2CH_2)_{p3}-C(=O)O-CH_2CH_3$, $CF_3O-(CF_2CF_2O)_m-(CF_2O)_n-(CF_2CH_2)_{p3}-C(=O)O-CH_2CH_2CH_3$, $CF_3O-(CF_2CF_2O)_m-(CF_2O)_n-(CH_2)_{p3}-C(=O)O-CH_3$, $CF_3O-(CF_2CF_2O)_m-(CF_2O)_n-(CH_2)_{p3}-C(=O)O-CH_2CH_3$, $CF_3O-(CF_2CF_2O)_m-(CF_2O)_n-(CH_2)_{p3}-C(=O)O-CH_2CH_2CH_3$, CF₃O—(CF₂CF₂O)ₘ—(CF₂O)ₙ—(CF₂)ₚ₃—C(=O)—O—C(=O)—CH₃,
CF₃O—(CF₂CF₂O)ₘ—(CF₂O)ₙ—(CF₂)ₚ₃—C(=O)—O—C(=O)—CH₂CH₃,
CF₃O—(CF₂CF₂O)ₘ—(CF₂O)ₙ—(CF₂)ₚ₃—C(=O)—O—C(=O)—CH₂CH₂CH₃,
CF₃O—(CF₂CF₂O)ₘ—(CF₂O)ₙ—(CF₂CH₂)ₚ₃—C(=O)—O—C(=O)—CH₃,
CF₃O—(CF₂CF₂O)ₘ—(CF₂O)ₙ—(CF₂CH₂)ₚ₃—C(=O)—O—C(=O)—CH₂CH₃,
CF₃O—(CF₂CF₂O)ₘ—(CF₂O)ₙ—(CF₂CH₂)ₚ₃—C(=O)—O—C(=O)—CH₂CH₂CH₃,
CF₃O—(CF₂CF₂O)ₘ—(CF₂O)ₙ—(CH₂)ₚ₃—C(=O)—O—C(=O)—CH₃,
CF₃O—(CF₂CF₂O)ₘ—(CF₂O)ₙ—(CH₂)ₚ₃—C(=O)—O—C(=O)—CH₂CH₃,
CF₃O—(CF₂CF₂O)ₘ—(CF₂O)ₙ—(CH₂)ₚ₃—C(=O)—O—C(=O)—CH₂CH₂CH₃,
CF₃O—(CF₂CF₂O)ₘ—(CF₂O)ₙ—(CF₂)ₚ₃—O—(C=O)—CH=CH₂,
CF₃O—(CF₂CF₂O)ₘ—(CF₂O)ₙ—(CF₂)ₚ₃—O—(C=O)—C(CH₃)=CH₂,
CF₃O—(CF₂CF₂O)ₘ—(CF₂O)ₙ—(CF₂)ₚ₃—O—(C=O)—CH=CHCH₃,
CF₃O—(CF₂CF₂O)ₘ—(CF₂O)ₙ—(CF₂CH₂)ₚ₃—O—(C=O)—CH=CH₂,
CF₃O—(CF₂CF₂O)ₘ—(CF₂O)ₙ—(CF₂CH₂)ₚ₃—O—(C=O)—C(CH₃)=CH₂,
CF₃O—(CF₂CF₂O)ₘ—(CF₂O)ₙ—(CF₂CH₂)ₚ₃—O—(C=O)—CH=CHCH₃,
CF₃O—(CF₂CF₂O)ₘ—(CF₂O)ₙ—(CH₂)ₚ₃—O—(C=O)—CH=CH₂,
CF₃O—(CF₂CF₂O)ₘ—(CF₂O)ₙ—(CH₂)ₚ₃—O—(C=O)—C(CH₃)=CH₂,
CF₃O—(CF₂CF₂O)ₘ—(CF₂O)ₙ—(CH₂)ₚ₃—O—(C=O)—CH=CHCH₃,
CF₃O—(CF₂CF₂O)ₘ—(CF₂O)ₙ—(CF₂)ₚ₃—O—(C=O)—CH=CH—(C=O)—O—CH₃,
CF₃O—(CF₂CF₂O)ₘ—(CF₂O)ₙ—(CF₂)ₚ₃—O—(C=O)—CH=CH—(C=O)—O—CH₂CH₃,
CF₃O—(CF₂CF₂O)ₘ—(CF₂)ₙ—(CF₂)ₚ₃—O—(C=O)—CH=CH—(C=O)—O—CH₂CH₂CH₃,
CF₃O—(CF₂CF₂O)ₘ—(CF₂O)ₙ—(CF₂CH₂)ₚ₃—O—(C=O)—CH=CH—(C=O)—O—CH₃,
CF₃O—(CF₂CF₂O)ₘ—(CF₂)ₙ—(CF₂CH₂)ₚ₃—O—(C=O)—CH=CH—(C=O)—O—CH₂CH₃,
CF₃O—(CF₂CF₂O)ₘ—(CF₂)ₙ—(CF₂CH₂)ₚ₃—O—(C=O)—CH=CH—(C=O)—O—CH₂CH₂CH₃,
CF₃O—(CF₂CF₂O)ₘ—(CF₂O)ₙ—(CH₂)ₚ₃—O—(C=O)—CH=CH—(C=O)—O—CH₃,
CF₃O—(CF₂CF₂O)ₘ—(CF₂O)ₙ—(CH₂)ₚ₃—O—(C=O)—CH=CH—(C=O)—O—CH₂CH₃,
CF₃O—(CF₂CF₂O)ₘ—(CF₂)ₙ—(CH₂)ₚ₃—O—(C=O)—CH=CH—(C=O)—O—CH₂CH₂CH₃,
CF₃O—(CF₂CF₂O)ₘ—(CF₂O)ₙ—(CF₂)ₚ₃—O—C(=O)—O—CH₃,
CF₃O—(CF₂CF₂O)ₘ—(CF₂O)ₙ—(CF₂)ₚ₃—O—C(=O)—O—CH₂CH₃,
CF₃O—(CF₂CF₂O)ₘ—(CF₂O)ₙ—(CF₂)ₚ₃—O—C(=O)—O—CH₂CH₂CH₃,
CF₃O—(CF₂CF₂O)ₘ—(CF₂O)ₙ—(CF₂CH₂)ₚ₃—O—C(=O)—O—CH₃,
CF₃O—(CF₂CF₂O)ₘ—(CF₂O)ₙ—(CF₂CH₂)ₚ₃—O—C(=O)—O—CH₂CH₃,
CF₃O—(CF₂CF₂O)ₘ—(CF₂CH₂O)ₙ—(CF₂)ₚ₃—O—C(=O)—O—CH₂CH₂CH₃, CF₃O—(CF₂CF₂O)ₘ—(CF₂O)ₙ—(CH₂)ₚ₃—O—C(=O)—O—CH₃,
CF₃O—(CF₂CF₂O)ₘ—(CF₂O)ₙ—(CH₂)ₚ₃—O—C(=O)—O—CH₂CH₃,
CF₃O—(CF₂CF₂O)ₘ—(CH₂O)ₙ—(CF₂)ₚ₃—O—C(=O)—O—CH₂CH₂CH₃, CF₃O—(CF₂CF₂)ₘ—(CF₂O)ₙ—(CF₂)ₚ₃—O—CH₂—[epoxide], CF₃O—(CF₂CF₂)ₘ—(CF₂O)ₙ—(CH₂)ₚ₃—O—CH₂—[epoxide], CF₃O—(CF₂CF₂)ₘ—(CF₂O)ₙ—(CF₂CH₂)ₚ₃—O—CH₂—[epoxide], CF₃O—(CF₂CF₂)ₘ—(CF₂O)ₙ—(CF₂)ₚ₃—O—CH₂—[methyl epoxide], CF₃O—(CF₂CF₂)ₘ—(CF₂O)ₙ—(CH₂)ₚ₃—O—CH₂—[methyl epoxide], CF₃O—(CF₂CF₂)ₘ—(CF₂O)ₙ—(CF₂CH₂)ₚ₃—O—CH₂—[methyl epoxide], CF₃O—(CF₂CF₂)ₘ—(CF₂O)ₙ—(CF₂)ₚ₃—O—CH₂—[dimethyl epoxide], CF₃O—(CF₂CF₂)ₘ—(CF₂O)ₙ—(CH₂)ₚ₃—O—CH₂—[dimethyl epoxide], CF₃O—(CF₂CF₂)ₘ—(CF₂O)ₙ—(CF₂CH₂)ₚ₃—O—CH₂—[dimethyl epoxide], CF₃O—(CF₂CF₂)ₘ—(CF₂O)ₙ—(CF₂)ₚ₃—O—[cyclic carbonate], CF₃O—(CF₂CF₂)ₘ—(CF₂O)ₙ—(CH₂)ₚ₃—O—[cyclic carbonate], CF₃O—(CF₂CF₂)ₘ—(CF₂O)ₙ—(CF₂CH₂)ₚ₃—O—[cyclic carbonate], CF₃O—(CF₂CF₂)ₘ—(CF₂O)ₙ—(CF₂)ₚ₃—O—[methyl cyclic carbonate], CF₃O—(CF₂CF₂)ₘ—(CF₂O)ₙ—(CH₂)ₚ₃—O—[methyl cyclic carbonate], CF₃O—(CF₂CF₂)ₘ—(CF₂O)ₙ—(CF₂CH₂)ₚ₃—O—[methyl cyclic carbonate], CF₃O—(CF₂CF₂)ₘ—(CF₂O)ₙ—(CH₂)ₚ₃—O—[ethyl cyclic carbonate], CF₃O—(CF₂CF₂)ₘ—(CF₂O)ₙ—(CF₂CH₂)ₚ₃—O—[ethyl cyclic carbonate], or -continued

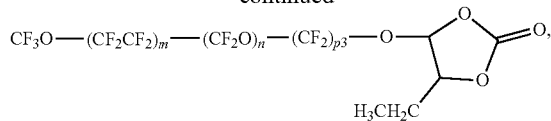

wherein m and n are each independently an integer of, for example, 1 to 110, 5 to 100, 10 to 80, 10 to 70, 10 to 50, or 10 to 40, m+n is in a range of, for example, 2 to 210, 2 to 200, 2 to 150, 5 to 100, or 10 to 50. p3 is an integer of 1 to 10.

The compound represented by Formula 2 or Formula 3 includes compounds represented by Formulas 6 to 8:

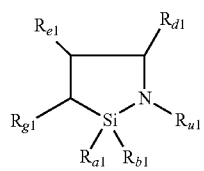

Formula 6

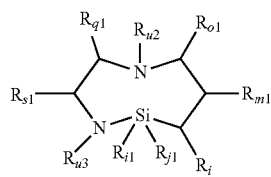

Formula 7

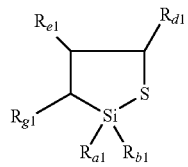

Formula 8 wherein, in the above formulas, $R_{a1}$, $R_{b1}$, $R_{i1}$, $R_{j1}$, $R_{a1}$, and $R_{b1}$ are each independently a substituted or unsubstituted C1 to C20 alkoxy group, a substituted or unsubstituted C1 to C20 alkyl group, or a hydroxy group, and $R_{d1}$, $R_{e1}$, $R_{g1}$, $R_{e1}$, $R_{m1}$, $R_{o1}$, $R_{q1}$, $R_{s1}$, $R_{u1}$, $R_{u2}$, and $R_{u3}$ are each independently a hydrogen, a substituted or unsubstituted C1 to C20 alkyl group, or a substituted or unsubstituted C2 to C20 alkenyl group.

The compound represented by Formula 2 or Formula 3 may include, for example, compounds represented by Formulas 9 to 11:

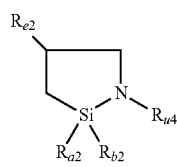

Formula 9

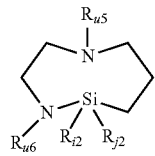

Formula 10

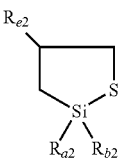

Formula 11 wherein, in the above formulas, $R_{a2}$, $R_{b2}$, $R_{i2}$, and $R_{j2}$ are each independently a substituted or unsubstituted C1 to C20 alkoxy group, or a substituted or unsubstituted C1 to C20 alkyl group, and $R_{e2}$, $R_{u4}$, $R_{u5}$, and $R_{u6}$ are each independently a hydrogen, a substituted or unsubstituted C1 to C20 alkyl group, or a substituted or unsubstituted C2 to C20 alkenyl group.

The compound represented by Formula 2 or Formula 3 may include, for example, compounds represented by Formulas 12a to 12n:

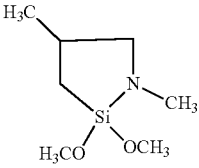

Formula 12a

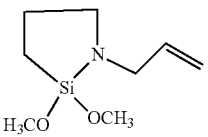

Formula 12b

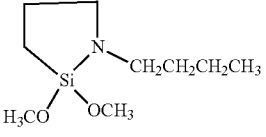

Formula 12c

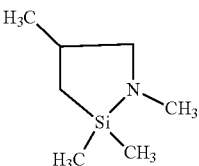

Formula 12d

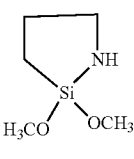

Formula 12e

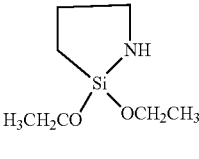

Formula 12f

Formula 12g

-continued

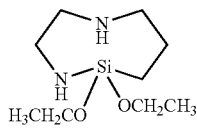
Formula 12h

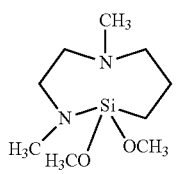
Formula 12i

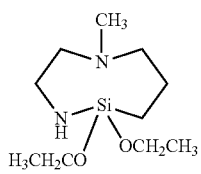
Formula 12j

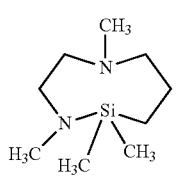
Formula 12k

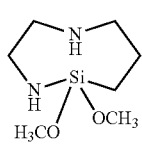
Formula 12l

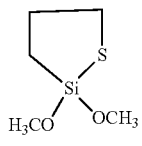
Formula 12m

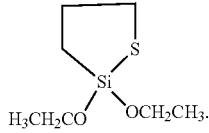
Formula 12n

In the compounds represented by Formulas 1 and 4, the fluorine-containing (poly)ether group may have a weight average molecular weight of, for example, about 1,000 grams per mole (g/mol) to about 20,000 g/mol, about 1,000 g/mol to about 15,000 g/mol, about 1,000 g/mol to about 10,000 g/mol, about 2,000 g/mol to about 9,000 g/mol, about 3,000 g/mol to about 8,000 g/mol, about 3,000 g/mol to about 7,000 g/mol, or about 3,000 g/mol to about 6,000 g/mol.

In the composition including the silane compound represented by Formula 1 and the amine compound represented by Formula 2, a mixing molar ratio of the silane compound represented by Formula 1 and the amine compound represented by Formula 2 may be, for example, about 1:0.1 to about 1:10, about 1:0.2 to about 1:10, about 1:0.5 to about 1:10, about 1:0.8 to about 1:10, about 1:1 to about 1:10, or about 1:1 to about 1:5.

The compound represented by Formula 1 and the compound represented by Formula 2 or Formula 3 may be in a liquid phase or a gas phase.

In an embodiment, the compound represented by Formula 1 and the compound represented by Formula 2 or Formula 3 may be applied onto a substrate in a liquid phase. In the liquid-phase composition, a mixing molar ratio of the compound represented by Formula 1 and the compound represented by Formula 2 or Formula 3 may be, for example, about 1:0.1 to about 1:10, about 1:0.2 to about 1:10, about 1:0.5 to about 1:10, about 1:0.8 to about 1:10, about 1:1 to about 1:10, or about 1:1 to about 1:5.

In an embodiment, a composition including the compound represented by Formula 1 and the compound represented by Formula 2 or Formula 3 may be impregnated into a substrate in a liquid phase or may be injected into a vessel, the prepared composition may be vaporized to then be fed to a chamber, and the composition in a gas phase may be applied onto the substrate. A mixing molar ratio of the compound represented by Formula 1 and the compound represented by Formula 2 or Formula 3 included in the gas-phase composition obtained in the chamber, may be, for example, about 1:0.1 to about 1:10, about 1:0.2 to about 1:10, about 1:0.5 to about 1:10, about 1:0.8 to about 1:10, about 1:1 to about 1:10, or about 1:1 to about 1:5. The mixing molar ratio of the gas-phase composition may be determined by the mixing molar ratio of the liquid-phase composition. A pressure in the chamber may not be higher than the atmospheric pressure. The pressure in the chamber may be, for example, about 101325 pascal (Pa) or less, about 10000 Pa or less, about 5000 Pa or less, about 1000 Pa or less, about 500 Pa or less, about 100 Pa or less, about 50 Pa or less, or about 10 Pa or less. The pressure in the chamber may be, for example, about 1 Pa to about 101325 Pa, about 1 Pa to about 10000 Pa, about 1 Pa to about 5000 Pa, about 1 Pa to about 1000 Pa, about 1 Pa to about 500 Pa, about 1 Pa to about 50 Pa, or about 1 Pa to about 10 Pa.

In an embodiment, the compound represented by Formula 1 and the compound represented by Formula 2 or Formula 3 may be impregnated into separate substrates in a liquid phase or may be injected into separate vessels, respectively, the prepared products may be vaporized to then be fed to a chamber along separate supply lines and mixed therein, thereby obtaining a gas-phase composition, and the obtained gas-phase composition may be supplied to the substrate. A mixing molar ratio of the compound represented by Formula 1 and the compound represented by Formula 2 or Formula 3 included in the gas-phase composition obtained in the chamber may be, for example, about 1:0.1 to about 1:10, about 1:0.2 to about 1:10, about 1:0.5 to about 1:10, about 1:0.8 to about 1:10, about 1:1 to about 1:10, or about 1:1 to about 1:5. The mixing molar ratio of the gas-phase composition may be determined by feeding rates of the compound represented by Formula 1 and the compound represented by Formula 2 or Formula 3, which are supplied to the chamber. A pressure in the chamber may not be higher than the atmospheric pressure. The pressure in the chamber may be, for example, about 101325 Pa or less, about 10000 Pa or less, about 5000 Pa or less, about 1000 Pa or less, about 500 Pa or less, about 100 Pa or less, about 50 Pa or less, or about 10 Pa or less. The pressure in the chamber may be, for example, about 1 Pa to about 101325 Pa, about 1 Pa to about 10000 Pa, about 1 Pa to about 5000 Pa, about 1 Pa to about 1000 Pa, about 1 Pa to about 500 Pa, about 1 Pa to about 50 Pa, or about 1 Pa to about 10 Pa.

The composition may further include a solvent. The solvent may be, for example, a fluorinated ether-based solvent. Examples of the fluorinated ether-based solvent may include 1,1,2,2-Tetrafluoroethyl-2,2,3,3-tetrafluoropropyl ether, 1,1,2,2-tetrafluoroethyl-1H,1H,5H-octafluoropeityl ether, 1,1,2,2-Tetrafluoroethyl-2,2,2-trifluoroethyl ether, or a mixture thereof, but are not limited thereto.

The composition may further include an additive. For example, the composition may further include an additive capable of interacting with the compound represented by Formula 1 and/or the compound represented by Formula 2 or Formula 3. When the composition further includes the above-described additive together, durability of a coating film produced from the composition may be further improved. The additive may be an acyclic silane compound having a fluorine-containing (poly)ether group. By further including the additive capable of interacting with the compound represented by Formula 1 and/or the compound represented by Formula 2 or Formula 3, the composition may firmly maintain inter-chain interactions among adjacent molecular chains of a plurality of polycondensation products, and thus reduce or prevent damage and/or destruction of the bonding of the plurality of polycondensation products due to frequent frictions. In an embodiment, the composition may prevent a surface coating material from being easily worn away due to frequent frictions and may reinforce the durability.

The additive may include, for example, an acyclic silane compound represented by Formula 13 and 14:

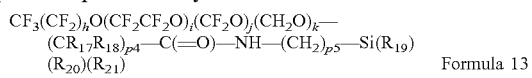

$$CF_3(CF_2)_hO(CF_2CF_2O)_i(CF_2O)_j(CH_2O)_k-$$
$$(CR_{17}R_{18})_{p4}-C(=O)-NH-(CH_2)_{p5}-Si(R_{19})$$
$$(R_{20})(R_{21}) \quad \text{Formula 13}$$

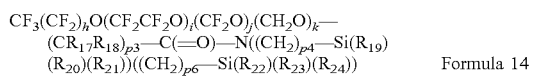

$$CF_3(CF_2)_hO(CF_2CF_2O)_i(CF_2O)_j(CH_2O)_k-$$
$$(CR_{17}R_{18})_{p3}-C(=O)-N((CH_2)_{p4}-Si(R_{19})$$
$$(R_{20})(R_{21}))((CH_2)_{p6}-Si(R_{22})(R_{23})(R_{24})) \quad \text{Formula 14}$$

wherein, in the above formulas, $R_{17}$ and $R_{18}$ are each independently a hydrogen, C1-C5 alkyl, fluorine, or a fluorinated C1-C5 alkyl group, p4, p5, and p6 are each independently an integer of 1 to 10, h and k are each independently an integer of 0 to 10, i and j are each independently an integer of 1 to 100, $R_{17}$, $R_{18}$, $R_{19}$, $R_{20}$, $R_{21}$, $R_{22}$, $R_{23}$, and $R_{24}$ are each independently a hydrogen, a substituted or unsubstituted C1 to C20 alkoxy group, a halogen atom, a hydroxy group, a substituted or unsubstituted C1 to C20 alkyl group, a substituted or unsubstituted C6 to C20 aryl group, or a combination thereof, with the proviso that at least one of $R_{19}$, $R_{20}$, and $R_{21}$ is a substituted or unsubstituted C1 to C20 alkoxy group, a halogen atom, or a hydroxy group, and at least one of $R_{22}$, $R_{23}$, and $R_{24}$ is a substituted or unsubstituted C1 to C20 alkoxy group, a halogen atom, or a hydroxy group.

Film

A film according to an embodiment may include a ring-opening reaction product of a compound represented by Formula 2 or Formula 3, a compound including a ring-opening reaction product of the compound represented by Formula 2 or Formula 3 and the fluorine-containing (poly)ether group represented by Formula 1, or a polycondensation product of a ring-opening reaction product of the compound represented by Formula 2 or Formula 3 and a compound represented by Formula 1, or a combination thereof. By including the ring-opening reaction product, and the polycondensation product of the compound, the film may have improved durability.

In the present specification, "a ring-opening reaction product" of a compound means a resultant product obtained by a ring-opening reaction, and optionally subsequent hydrolysis and/or polycondensation, of the heteroatom-containing cyclic silane compound. The resultant product of the ring-opening reaction may be, for example, a compound bonded to a substrate. In the present specification, "a polycondensation product" of a compound means a resultant product obtained by a polycondensation reaction of a compound having a fluorine-containing (poly)ether group and a ring-opening reaction product of a cyclic silane compound.

The film may include, for example, a ring-opening reaction product of the compound represented by Formula 2 or Formula 3. The film may further include a compound represented by Formula 1.

A mixing molar ratio of the ring-opening reaction product of the compound represented by Formula 2 or Formula 3 and the compound represented by Formula 1, included in the film, may be, for example, about 1:0.1 to about 1:10, about 1:0.2 to about 1:10, about 1:0.5 to about 1:10, about 1:0.8 to about 1:10, about 1:1 to about 1:10, or about 1:1 to about 1:5.

The film may include, for example, a polycondensation product of the ring-opening reaction product of the compound represented by Formula 2 or Formula 3 and the compound represented by Formula 1. The film may be formed by forming a polycondensation product through a polycondensation reaction after the ring-opening reaction product of the heteroatom-containing cyclic silane compound is bonded to a substrate surface, an end of the ring-opening reaction product and the compound represented by Formula 1.

The film may include, for example, a polycondensation product of the compound represented by Formula 2 or Formula 3 and the compound represented by Formula 1. The film may be formed by binding a forming a polycondensation product through a cyclic silane compound with a substrate surface through a ring-opening reaction after forming a polycondensation product of the compound represented by Formula 2 or Formula 3 and the compound represented by Formula 1 through a polycondensation reaction.

The film may have a thickness of, for example, about 1 micrometer (μm) or less, about 500 nanometer (nm) or less, about 100 nm or less, about 50 nm or less, about 40 nm or less, about 30 nm or less, about 20 nm or less, or about 15 nm or less. The film may have a thickness of, for example, 1 nm to about 1000 nm, 1 nm to about 700 nm, 1 nm to about 500 nm, 1 nm to about 300 nm, 1 nm to about 200 nm, 1 nm to about 100 nm, 1 nm to about 50 nm, 1 nm to about 30 nm, 1 nm to about 20 nm, 1 nm to about 15 nm, or 1 nm to about 10 nm. The film may be, for example, a transparent film.

The film may be disposed on, for example, a substrate. In a film disposed on a substrate, a silane group of the polycondensation product of the ring-opening reaction product of the compound represented by Formula 2 or Formula 3 and the compound represented by Formula 1 may be boned to the substrate, and a fluorine-containing (poly)ether group may be arranged at a surface (air) side. The polycondensation product of the ring-opening reaction product of the compound represented by Formula 2 or Formula 3 and the compound represented by Formula 1 may be arranged in a substantially perpendicular to the substrate. The film may be a non-self-supporting film that is disposed on a substrate and requires a substrate.

Anti-fingerprint coating performance of a film may be quantified by analyzing a water contact angle and/or a diiodomethane contact angle at room temperature, for example, 25° C.

A contact angle of a film may be measured using water. The film may have an improved contact angle by including a fluorine-containing (poly)ether group on a surface thereof. In an embodiment, the film may have good slipperiness and water repellency. The film may have a contact angle of, for example, about 100° or greater, about 105° or greater, about 110° or greater, or about 115° or greater, for example, about 100° to about 180°, about 105° to about 180°, about 110° to about 180°, about 115° to about 180°, or about 120° to about 180°. The contact angle may be measured by using a Sessile drop technique. A liquid used in measuring the contact angle may be water, and the contact angle may be measured by dropping a predetermined amount (about 3 microliter (μl)) of water on a film surface using a Drop Shape Analyzer (DSA100, KRUSS, Germany).

The film may maintain a high contact angle even after frequent frictions. Durability of a film may be evaluated by measuring a contact angle change after multiple times of friction. For example, after an abrasion test (5,000 times of rubbing) with a rubber eraser having a load of 1 kilogram (kg), the film may have a contact angle change of about 20° or less, about 18° or less, about 15° or less, about 12° or less, or about 10° or less, for example, about 0.5° to about 20°, about 1° to about 20°, about 1° to about 15°, about 1° to about 12°, about 1° to about 10°, or about 1° to about 5°. For example, the film may have a contact angle of about 95° or greater even after an abrasion test (1,000 times of rubbing) with a rubber eraser having a load of 1 kg. For example, the film may have a contact angle of about 50° or greater even after an abrasion test (10,000 times of rubbing) with a rubber eraser having a load of 1 kg. For example, the film may have a contact angle of about 95° to about 175°, about 75° to about 175°, about 60° to about 175°, or about 50° to about 175° even after an abrasion test (1,000 times of rubbing) with a rubber eraser having a load of 1 kg.

In an embodiment, a contact angle of a film may be measured using diiodomethane. In this case, the film may have a contact angle of, for example, about 90° or greater, about 95° or greater or about 97° or greater, for example, about 90° to about 180°, about 95° to about 180°, about 97° to about 180°, about 100° to about 170°, or about 110° to about 180°. The contact angle may be measured by using a Sessile drop technique. A liquid used in measuring the contact angle may be diiodomethane, and the contact angle may be measured by dropping a predetermined amount (about 2.7 μl) of diiodomethane on a film surface using a Drop Shape Analyzer (DSA100, KRUSS, Germany).

Display Device

A display device according to an embodiment includes a film including a ring-opening reaction product of a compound represented by Formula 2 or Formula 3, a compound including a ring-opening reaction product of the compound represented by Formula 2 or Formula 3, the fluorine-containing (poly)ether group represented by Formula 1, or a combination thereof, or a polycondensation product of a ring-opening reaction product of the compound represented by Formula 2 or Formula 3, a compound represented by Formula 1, or a combination thereof. The display device includes a film including a ring-opening reaction product and a polycondensation product of the above-described compound.

By including the film, the display device may have improved durability.

Figure 2:
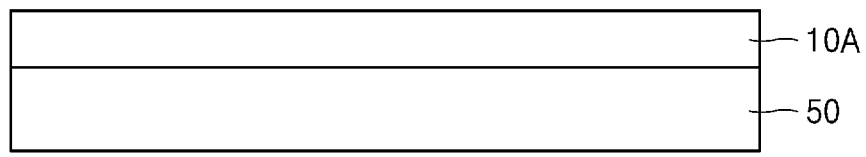
FIG. 2 is a cross-sectional view of a display device according to an embodiment.

Referring to FIG. 2, a display device 100 according to an embodiment includes a display panel 50 and a functional film 10A. The display panel 50 may be, for example, an organic light emitting panel or a liquid crystal panel. The display panel 50 may be, for example, a bendable display panel, a foldable display panel, or a rollable display panel. The functional film 10A may include the film or a stacked structure thereof, and may be disposed on the side of an observer. Another layer may be further disposed between the display panel 50 and the functional film 10A. For example, a monolayer or a plurality of layers of a polymer layer (not shown) and optionally a transparent adhesive layer (not shown) may be further disposed between the display panel 50 and the functional film 10A.

Figure 3:
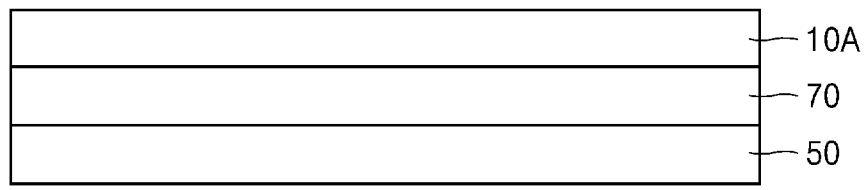
FIG. 3 is a cross-sectional view of a display device according to an embodiment.

Referring to FIG. 3, a display device 200 according to an embodiment includes a display panel 50, a functional film 10A, and a touch screen panel 70 disposed between the display panel 50 and the functional film 10A. The display panel 50 may be, for example, an organic light emitting panel or a liquid crystal panel. The display panel 50 may be, for example, a bendable display panel, a foldable display panel, or a rollable display panel. The functional film 10A may include the film or a stacked structure thereof, and may be disposed on the side of an observer.

The touch screen panel 70 may be disposed adjacent to each of the functional film 10A and the display panel 50 and, when a human hand or an object touches the touch screen panel 70 through the functional film 10A, may recognize a touched position and a position change and then output a touch signal. A driving module (not shown) may identify a touch position from the output touch signal, identify an icon indicated at the identified touch position, and control to carry out functions corresponding to the identified icon, and the results of the functions performed may be displayed on the display panel 50. Another layer may be further disposed between the touch screen panel 70 and the functional film 10A. For example, a monolayer or a plurality of layers of a polymer layer (not shown) and optionally a transparent adhesive layer (not shown) may be further disposed between the touch screen panel 70 and the functional film 10A. Another layer may be further disposed between the touch screen panel 70 and the display panel 50. For example, a monolayer or a plurality of layers of a polymer layer (not shown) and optionally a transparent adhesive layer (not shown) may be further disposed between the touch screen panel 70 and the display panel 50. The functional film 10A including the film or a stacked structure thereof may be applied to a variety of electronic devices including a display device. Specifically, the functional film 10A may be applied to, for example, a smartphone, a tablet PC, a camera, a touch screen panel, etc., but not limited thereto.

Article

An article according to an embodiment may include a substrate; and a film disposed on the substrate, wherein the film includes a ring-opening reaction product of a compound represented by Formula 2 or Formula 3, a compound including a ring-opening reaction product of the compound represented by Formula 2 or Formula 3 and the fluorine-containing (poly)ether group represented by Formula 1, or a polycondensation product of a ring-opening reaction product of the compound represented by Formula 2 or Formula 3 and a compound having a fluorine-containing (poly)ether group represented by Formula 1, or a combination thereof. By including the film, the article may have improved durability.

A substrate may include, for example, ceramic, glass or a polymer, but not limited thereto. The film may be formed on the substrate to then be disposed thereon.

The substrate and the film may form, for example, a stacked structure. The stacked structure may further include one or more layers between the substrate and the film. The stacked structure may be a transparent film, for example, a transparent flexible film. In an embodiment, the film or the stacked structure may be attached on a display panel. Herein, the display panel and the film or the stacked structure may be directly bonded or may be bonded by interposing an adhesive. The display panel may be, for example, a liquid crystal panel or an organic light emitting panel, but not limited thereto. The film or the stacked structure may be disposed on the side of an observer. Examples of the article may include a mobile display device, a fixed display device, a display for an automobile, a display for an airplane, a head-up display (HUD), a mobile sensor, a fixed sensor, or an optical article, but not limited thereto.

A method for preparing an article according to an embodiment include applying the above-described composition onto a substrate to place a film thereon.

The compound represented by Formula 1 and the compound represented by Formula 2 or Formula 3 may be applied onto the substrate in a liquid phase or a gas phase, for example. The film may be formed by, for example, coating using a solution process in which the composition is supplied in a liquid phase, or deposition using a dry process in which the composition is supplied in a gas phase. Therefore, the film may be a coating film or a deposition film.

The applying of the composition onto the substrate to place the film thereon the substrate may include coating a solution prepared by dissolving or dispersing the composition in a solvent on the substrate by, for example, spin coating, slit coating, inkjet printing, spray coating or dipping, and drying. In an embodiment, the applying of the composition onto the substrate in a gas phase to place the film thereon the substrate may include coating the composition on the substrate by, for example, thermal deposition, vacuum deposition, or chemical vapor deposition.

The solvent may be, for example, a fluorinated ether-based solvent. Examples of the fluorinated ether-based solvent may include 1,1,2,2-Tetrafluoroethyl-2,2,3,3-tetrafluoropropyl ether, 1,1,2,2-tetrafluoroethyl-1H,1H,5H-octafluoropeityl ether, 1,1,2,2-Tetrafluoroethyl-2,2,2-trifluoroethyl ether, or a mixture thereof, but are not limited thereto.

Before the placing the film on the substrate by applying the composition onto the substrate, the method may further include placing an interlayer. The interlayer may include a metal oxide. The metal oxide may be, for example, silica ($SiO_2$). The interlayer may be, for example, a primer layer of $SiO_2$. The primer layer may have a thickness of about 100 nm or less, about 50 nm or less, about 30 nm or less, about 20 nm or less, about 10 nm or less, or about 7 nm or less, for example, about 0.1 nm to about 100 nm, about 1 nm to about 100 nm, about 7 nm to about 100 nm, about 10 nm to about 100 nm, about 20 nm to about 100 nm, about 30 nm to about 100 nm, about 50 nm to about 100 nm, about 70 nm to about 100 nm, or about 80 nm to about 100 nm.

Hereinafter, definitions of substituents of various chemical formulas used in the present specifications will be described.

As used herein, substituents of a substituted alkylene group, a substituted oxyalkylene group, a substituted alkoxy group, a substituted alkyl group, and a substituted aryl group each independently represent a halogen, a hydroxy group, a C1 to C5 alkyl group, a C1 to C5 alkoxy group, or a combination thereof.

As used herein, the term "alkyl" refers to a fully saturated branched or non-branched (or straight or linear) hydrocarbon.

Non-limiting examples of the "alkyl" may include methyl, ethyl, i-propyl, isopropyl, i-butyl, isobutyl, sec-butyl, i-pentyl, isopentyl, neopentyl, i-hexyl, 3-methylhexyl, 2,2-dimethylpentyl, 2,3-dimethylpentyl, and i-heptyl.

At least one hydrogen atom in the "alkyl" may be substituted by a substituent that is a halogen atom, a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a C1 to C20 alkyl group, a C2 to C20 alkenyl group, a C2 to C20 alkynyl group, a C6 to C30 aryl group, a C7 to C30 arylalkyl group, a C1 to C30 alkoxy group, a C1 to C30 alkylthio group, a C6-C30 aryloxy group, a C6-C30 arylthio group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C3 to C30 heterocycloalkyl group, and combinations thereof.

The term "halogen atom" or "halogen" includes fluorine, bromine, chlorine, and iodine.

As used herein, the term "alkoxy" refers to alkyl-O—, and the alkyl is the same as described above. Non-limiting examples of the alkoxy may include methoxy, ethoxy, propoxy, 2-propoxy, butoxy, tert-butoxy, pentyloxy, hexyloxy, cyclopropoxy, and cyclohexyloxy. At least one hydrogen atom in the alkoxy group may be substituted by the same substituent as that of the alkyl group.

As used herein, the term "alkylthio" refers to "alkyl-S—", where the alkyl is the same as defined above. Examples of the alkylthio group may include a thiomethyl group, a thioethyl group, a thiopropyl group, a 2-thiopropyl group, a thiobutyl group, a thio-tert-butyl group, a thiopentyl group, a thiohexyl group, a thiocyclopropyl group, and a thiocyclohexyl group. At least one hydrogen atom in the alkylthio group may be substituted with the same substituent as described above in connection with the alkyl group.

As used herein, the term "aryl" group, used alone or in combination, refers to an aromatic hydrocarbon including one or more rings.

The term "aryl" also includes a functional group having an aromatic ring fused with one or more cycloalkyl rings. Non-limiting examples of the "aryl" group include phenyl, naphthyl, and tetrahydronaphthyl. In addition, at least one hydrogen atom in the aryl group may be substituted by the same substituent as that of the alkyl group.

The term "aryloxy" used herein refers to aryl-O—, where the aryl is the same as defined above. Non-limiting examples of the aryloxy group may include a phenoxy group, a naphthoxy group, or a tetrahydronaphthyloxy group. At least one hydrogen atom of the "aryloxy" group may be substituted with the same substituent as described above in connection with the alkyl group.

The "arylthio" used herein refers to aryl-S—, where the aryl is the same as defined above. Non-limiting examples of the arylthio group may include a thiophenyl group, a thionaphthyl group, or a thiotetrahydronaphthyl group. At least one hydrogen atom of the "arylthio" group may be substituted with the same substituent as described above in connection with the alkyl group.

In addition, as used herein, when a specific definition is not otherwise provided, the term "hetero" refers to a functional group including 1 to 4 heteroatoms that are N, O, S, Se, Te, or P.

The term "room temperature" used herein refers to a temperature of about 25° C.

The present inventive concept will now be described some example embodiments are lustrated in more detail with reference to Examples and Comparative Examples. However, the following examples are for describing particular example embodiments only and are not intended to be limiting of the present inventive concept. The wording "'B' was used instead of 'A'" used in describing Synthesis Examples means that an amount of 'A' used was identical to an amount of 'B' used, in terms of a molar equivalent.

EXAMPLES

Preparation of Compositions and Films

Example 1: Composition of Ester Compound (A) and Cyclic Silane Compound (B) in Molar Ratio of 1:2 (p/q=1)

A first solution having 20 weight percent (wt %) of $CF_3O(CF_2CF_2O)_p(CF_2O)_qCF_2C(=O)OCH_3$ (p/q=~1, Mw=3800 g/mol, Solvay) as an ester compound (A) having a fluorine-containing (poly)ether group dissolved in a Novec HPE 7200 solvent (3M Company), was prepared. To the prepared first solution was added a second solution having 20 wt % of 2,2-dimethoxy-1,6-diaza-2-silacyclooctane as a heteroatom-containing cyclic silane compound (B) dissolved in dichloromethane, followed by mixing with a Vortex mixer, thereby preparing the composition.

A molar ratio of the ester compound (A) having a fluorine-containing (poly)ether group and the heteroatom-containing cyclic silane compound (B), included in the composition, was 1:2.

A sum of the amounts of the ester compound (A) having a fluorine-containing (poly)ether group and the heteroatom-containing cyclic silane compound (B) is 20 parts by weight, based on the total weight of 100 parts by weight of the prepared composition.

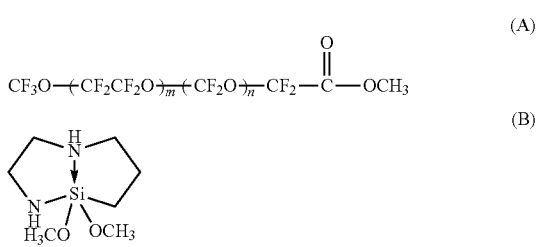

A glass substrate having 7 nm thick $SiO_2$ thermally deposited and a tablet having the composition impregnated therein were placed in a chamber. The composition vaporized in the vacuum chamber was deposited on the glass substrate under vacuum to produce a glass substrate having 10 nm thick film disposed thereon.

A ring-opening reactant was formed on the glass substrate by the vaporized cyclic silane (B), and the formed ring-opening reactant and the ester compound (A) produce a hydrolysis product and/or polycondensation product on the glass substrate, and thus a film was dry coated on the glass substrate.

During vacuum deposition, the amount of the composition impregnated was 0.4 gram per tablet (g/tablet).

Example 2: Composition of Ester Compound (A) and Cyclic Silane Compound (B) in Molar Ratio of 1:2 (p/q=0.6)

The composition was prepared in the same manner as in Example 1, except that an ester compound (A) was changed to $CF_3O(CF_2CF_2O)_p(CF_2O)_qCF_2C(=O)OCH_3$ (p/q=0.6, Mw=3800 g/mol, Solvay), and a glass substrate having 10 nm thick film disposed thereon was then prepared using the composition.

Example 3: Composition of Ester Compound (A) and Cyclic Silane Compound (B) in Molar Ratio of 1:1 (p/q=~1)

The composition was prepared in the same manner as in Example 1, except that a molar ratio of ester compound (A) and cyclic silane compound (B) was changed to 1:1, and a glass substrate having 10 nm thick film disposed thereon was then prepared using the composition.

Example 4: Composition of Ester Compound (A) and Cyclic Silane Compound (B) in Molar Ratio of 1:1.5 (p/q=~1)

The composition was prepared in the same manner as in Example 1, except that a molar ratio of ester compound (A) and cyclic silane compound (B) was changed to 1:1.5, and a glass substrate having 10 nm thick film disposed thereon was then prepared using the composition.

Example 5: Composition of Ester Compound (A) and Cyclic Silane Compound (B) in Molar Ratio of 1:3 (p/q=~1)

The composition was prepared in the same manner as in Example 1, except that a molar ratio of ester compound (A) and cyclic silane compound (B) was changed to 1:3, and a glass substrate having 10 nm thick film disposed thereon was then prepared using the composition.

Example 6: Composition of Ester Compound (A) and Cyclic Silane Compound (B) in Molar Ratio of 1:3 (p/q=0.6)

The composition was prepared in the same manner as in Example 1, except that an ester compound (A) was changed to $CF_3O(CF_2CF_2O)_p(CF_2O)_qCF_2C(=O)OCH_3$ (p/q=0.6, Mw=3800 g/mol, Solvay) and a molar ratio of ester compound (A) and cyclic silane compound (B) was changed to 1:3, and a glass substrate having 10 nm thick film disposed thereon was then prepared using the composition.

Example 7: Composition of Ester Compound (A) and Cyclic Silane Compound (B) in Molar Ratio of 1.5:1 (p/q=~1)

The composition was prepared in the same manner as in Example 1, except that a molar ratio of ester compound (A) and cyclic silane compound (B) was changed to 1.5:1, and a glass substrate having 10 nm thick film disposed thereon was then prepared using the composition.

Comparative Example 1: Silane Compound (C) Having Fluorine-Containing (Poly)Ether Group Preparation of Silane Compound Having Fluorine-Containing (Poly)Ether Group To a 100 milliliter (ml) reactor with a stirrer and a heater was added 20 gram (g) of $CF_3O(CF_2CF_2O)_p(CF_2O)_qCF_2C(=O)OCH_3$ (p/q=1, Mw=3800 g/mol, Solvay), and 0.9 g of allyl amine, followed by stirring at room temperature for 3 hours. Next, unreacted allyl amine, and methanol formed during the reaction were removed under high-temperature vacuum conditions of 80° C. and 1 Torr using a rotary pump. The obtained product was dissolved in a Novec 7200 solvent and then purified by allowing the solution to pass through silica gel, thereby obtaining $CF_3O(CF_2CF_2O)_p(CF_2O)_qCF_2C(=O)NHCH_2CH=CH_2$.

To a 100 ml reactor with a stirrer and a heater was injected 15 g of $CF_3O(CF_2CF_2O)_p(CF_2O)_qCF_2C(=O)NHCH_2CH=CH_2$, 0.73 g of trimethoxy silane and 80 microliter (µl) of a xylene solution of platinum(0)-1,3-divinyl-1,1,3,3-tetramethylsiloxane complex were added thereto, followed by stirring at 60° C. for 12 hours. Next, unreacted trimethoxy silane was removed under high-temperature vacuum conditions of 80° C. and 1 Torr using a rotary pump, and then filtered using a celite filter, thereby obtaining $CF_3O(CF_2CF_2O)_p(CF_2O)_qCF_2C(=O)NHCH_2CH_2CH_2Si(OCH_3)_3$ as a silane compound (C) having a fluorine-containing (poly)ether group.

Preparation of Compositions and Films 1 g of $CF_3O(CF_2CF_2O)_p(CF_2O)_qCF_2C(=O)NHCH_2CH_2CH_2Si(OCH_3)_3$ as a silane compound (C) having a fluorine-containing (poly)ether group was added to 4 g of a Novec HPE 7200 solvent (3M Company), thereby preparing a composition having 20 wt % of $CF_3O(CF_2CF_2O)_p(CF_2O)_qCF_2C(=O)NHCH_2CH_2CH_2Si(OCH_3)_3$ dissolved therein.

A glass substrate having a 10 nm thick film disposed thereon was prepared in the same manner as in Example 1, except that the composition was used.

Comparative Example 2: Silane Compound (D) Having Fluorine-Containing (Poly)Ether Group A film was prepared in the same manner as in Example 1, except that a commercially available perfluoro (poly)ether silane compound (OPTOOL US509, Daikin) was used.

Evaluation Example 1: Evaluation of Durability and Slipperiness

The durability and slipperiness of each of the films prepared in Examples 1 to 7 and Comparative Examples 1 and 2 were evaluated.

Durability of a film may be evaluated by measuring a contact angle change due to friction.

An initial contact angle was evaluated by using a Sessile drop technique and measured by dropping water dropwise on each film at 25° C. with a Drop shape analyzer (DSA100, KRUSS, Germany).

Subsequently, the respective films were rubbed multiple times (5000 times (5K), 10000 times (10K), 12000 times (12K), 15000 times (15K), and 20000 times (20K)) using a polyurethane rubber eraser having a load of 1 kg and a width of 6 mm. After rubbing at 25° C., a water contact angle was measured in the same manner as the initial contact angle, and Table 1 summarizes numbers of times of rubbing, in which the water contact angle was maintained at about 100° or greater. As the number of times of rubbing increases, the film has improved durability.

The slipperiness was evaluated by measuring a coefficient of friction (COF) at 25° C. using a standard measuring method provided in the manual of a friction tester (model FPT-F1, Labthink). Some of COF measurement results are shown in Table 1.

TABLE 1

| | Coefficient of friction (COF) | Initial contact angle [degree] | Number of times of rubbing [Number of times] |
|---|---|---|---|
| Example 1 | 0.07 | 117 | 20K |
| Example 2 | 0.06 | 117 | 20K |
| Example 3 | 0.06 | 117 | 10K |
| Example 4 | 0.07 | 117 | 15K |
| Example 5 | 0.06 | 117 | 12K |
| Example 6 | 0.06 | 117 | 15K |
| Example 7 | 0.07 | 116 | 10K |
| Comparative Example 1 | 0.07 | 118 | 10K |
| Comparative Example 2 | 0.07 | 118 | 5K |

As indicated in Table 1, the numbers of times of rubbing of the films prepared in Examples 1 to 7 were all 10K or greater, in which contact angles of 100° or greater were maintained.

Specifically, the numbers of times of rubbing of the films prepared in Examples 1, 2 and 4 to 6 were all 12K or greater, and the contact angles of the films were maintained at 100° or greater.

Therefore, it was confirmed that the films prepared in Examples 1 to 7 showed improved durability against a friction, as compared with the film prepared Comparative Example 1.

The films prepared in Examples 1 to 7 showed a coefficient of friction of 0.1 or less, suggesting that good slipperiness was attained, like the films prepared in Comparative Examples 1 and 2.

According to an aspect, by inclusion of a composition comprising a compound having a fluorine-containing (poly)ether group and a heteroatom-containing cyclic silane compound, a film prepared from the composition and a display and an article including the film may have improved durability.

It should be understood that the embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the present detailed description as defined by the following claims.

What is claimed is:

1. An article comprising: a substrate; and a material comprising
   a compound of a ring-opening reaction product of a cyclic silane represented by Formula 2 or Formula 3, and a fluorine-containing (poly)ether group represented by Formula 1,
   a polycondensation product of a ring-opening reaction product of the compound represented by Formula 2 or Formula 3, and a compound represented by Formula 1, or a combination thereof:

$$Rf—(L1)_{p1}—Q1 \quad \text{Formula 1}$$

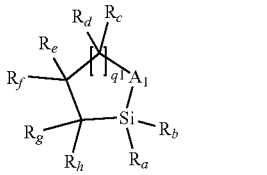

Formula 2

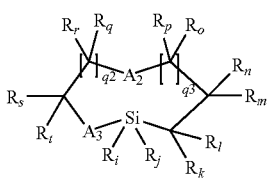

Formula 3 wherein, in Formulas 1 to 3,

Rf is a fluorine-containing (poly)ether group,

L1 is a substituted or unsubstituted C1 to C20 alkylene group, a substituted or unsubstituted C1 to C20 oxyalkylene group, or a combination thereof, Q1 is $-C(=O)O-R_1$, $-C(=O)-O-C(=O)-R_2$, $-O-(C=O)-CR_3=CR_4R_5$, $-O-(C=O)-CR_6=CR_7-(C=O)-O-R_8$, $-O-C(=O)-O-R_9$, an epoxy-containing group, or a cyclic carbonate-containing group, p1 is an integer of 1 to 10, q1, q2, and q3 are each independently an integer of 1 to 10, A1, A2, and A3 are each independently $=N-R_u$ or $-S-$, $R_1$, $R_2$, $R_5$, $R_8$, and $R_9$ are each independently a substituted or unsubstituted C1 to C20 alkyl group, or a substituted or unsubstituted C6 to C20 aryl group, $R_3$, $R_4$, $R_6$, and $R_7$ are each independently a hydrogen, a halogen atom, a hydroxy group, a substituted or unsubstituted C1 to C20 alkyl group, or a substituted or unsubstituted C6 to C20 aryl group, $R_a$, $R_b$, $R_i$, and $R_j$ are each independently a substituted or unsubstituted C1 to C20 alkoxy group, a substituted or unsubstituted C1 to C20 alkyl group, a substituted or unsubstituted C6 to C20 aryl group, a halogen, or a hydroxy group, and $R_c$, $R_d$, $R_e$, $R_f$, $R_g$, $R_h$, $R_k$, $R_l$, $R_m$, $R_n$, $R_o$, $R_p$, $R_q$, $R_r$, $R_s$, $R_t$, and $R_u$ are each independently a hydrogen, a substituted or unsubstituted C1 to C20 alkyl group, a substituted or unsubstituted C6 to C20 aryl group, or a substituted or unsubstituted C2 to C20 alkenyl group.

2. The article of claim 1, wherein the compound represented by Formula 1 is a compound represented by Formula 4:

$$Rf_a-O-Lf_b-(L1)_{p2}-Q1 \quad \text{Formula 4}$$

wherein, in Formula 4, $Rf_a$ is a C1 to C20 perfluoroalkyl group, $Lf_b$ is a (poly)oxyalkylene group comprising a fluorine-containing C1 to C5 alkylene group, L1 is a substituted or unsubstituted C1 to C20 alkylene group, a substituted or unsubstituted C1 to C20 oxyalkylene group, or a combination thereof, Q1 is $-C(=O)O-R_1$, $-C(=O)-O-C(=O)-R_2$, $-O-(C=O)-CR_3=CR_4R_5$, $-O-(C=O)-CR_6=CR_7-(C=O)-O-R_8$, $-O-C(=O)-O-R_9$, an epoxy-containing group, or a cyclic carbonate-containing group, p2 is an integer of 1 to 10, $R_1$, $R_2$, $R_5$, $R_8$, and $R_9$ are each independently a substituted or unsubstituted C1 to C20 alkyl group, or a substituted or unsubstituted C6 to C20 aryl group, and $R_3$, $R_4$, $R_6$, and $R_7$ are each independently a hydrogen, a halogen atom, a hydroxy group, a substituted or unsubstituted C1 to C20 alkyl group, or a substituted or unsubstituted C6 to C20 aryl group.

3. The article of claim 2, wherein $Lf_b$ is a (poly)oxyalkylene group comprising one or more repeating units of the formulae $-CFXO-$, $-CFXCFXO-$, $-CF_2CF_2CF_2O-$, $-CF_2CF_2CF_2CF_2O-$, or $-CF_2CF_2CF_2CF_2CF_2O-$, the number of repeating units is 2 to 510, and X is Cl, Br, or I.

4. The article of claim 1, wherein Rf is a perfluoro(poly)ether group.

5. The article of claim 1, wherein the fluorine-containing (poly)ether group has a structure in which:

a $CF_3O$ group, a $CF_3CF_2O$ group, or a $CF_3CF_2CF_2O$ group is present at an end thereof, and $-(CF_2CF_2O)_m-$ and $-(CF_2O)_n-$ (wherein m and n are each independently an integer of 1 to 110, and m+n is 2 to 210) are bound to the $CF_3O$ group, the $CF_3CF_2O$ group, or the $CF_3CF_2CF_2O$ group;

a structure in which a $CF_3O$ group, a $CF_3CF_2O$ group, or a $CF_3CF_2CF_2O$ group is present at an end thereof, and $-(CF_2CF_2O)_m-$, $-(CF_2O)_{n1}-$, and $-(CF_2CF_2CF_2O)_{n2}-$ (wherein m, n1, and n2 are each independently an integer of 1 to 110, and m+n1+n2 is in a range of 3 to 310) are bound to the $CF_3O$ group, the $CF_3CF_2O$ group, or the $CF_3CF_2CF_2O$ group;

a structure in which a $CF_3O$ group, a $CF_3CF_2O$ group, or a $CF_3CF_2CF_2O$ group is present at an end thereof, and $-(CF_2CF_2O)_m-$, $-(CF_2O)_{n1}-$, $-(CF_2CF_2CF_2O)_{n2}-$, and $-(CF_2CF_2CF_2CF_2O)_{n3}-$ (wherein m, n1, n2, and n3 are each independently an integer of 1 to 110, and m+n1+n2+n3 is in a range of 4 to 410) are bound to the $CF_3O$ group, the $CF_3CF_2O$ group, or the $CF_3CF_2CF_2O$ group; or a structure in which a $CF_3O$ group, a $CF_3CF_2O$ group, or a $CF_3CF_2CF_2O$ group is present at an end thereof, and $-(CF_2CF_2O)_m-$, $-(CF_2O)_{n1}-$, $-(CF_2CF_2CF_2O)_{n2}-$, $-(CF_2CF_2CF_2CF_2O)_{n3}-$, and $-(CF_2CF_2CF_2CF_2CF_2O)_{n4}-$ (wherein m, n1, n2, n3, and n4 are each independently an integer of 1 to 110, and m+n1+n2+n3+n4 is in a range of 5 to 510) are bound to the $CF_3O$ group, the $CF_3CF_2O$ group, or the $CF_3CF_2CF_2O$ group.

6. The article of claim 1, wherein Rf is $CF_3O-(CF_2CF_2O)_m-(CF_2O)_n-$, $CF_3O-(CF_2CF_2O)_m-(CF_2O)_{n1}-(CF_2CF_2CF_2O)_{n2}-$, $CF_3O-(CF_2CF_2O)_m-(CF_2O)_{n1}-(CF_2CF_2CF_2O)_{n2}-(CF_2CF_2CF_2CF_2O)_{n3}-$, $CF_3O-(CF_2CF_2O)_m-(CF_2O)_{n1}-(CF_2CF_2CF_2O)_{n2}-(CF_2CF_2CF_2CF_2O)_{n3}-(CF_2CF_2CF_2CF_2CF_2O)_{n4}-$, $CF_3CF_2O-(CF_2CF_2O)_m-(CF_2O)_n-$, $CF_3CF_2O-(CF_2CF_2O)_m-(CF_2O)_{n1}-(CF_2CF_2CF_2O)_{n2}-$, $CF_3CF_2O-(CF_2CF_2O)_m-(CF_2O)_{n1}-(CF_2CF_2CF_2O)_{n2}-(CF_2CF_2CF_2CF_2O)_{n3}-$, $CF_3CF_2O-(CF_2CF_2O)_m-(CF_2O)_{n1}-(CF_2CF_2CF_2O)_{n2}-(CF_2CF_2CF_2CF_2O)_{n3}-(CF_2CF_2CF_2CF_2CF_2O)_{n4}-$, $CF_3CF_2CF_2O-(CF_2CF_2O)_m-(CF_2O)_n-$, $CF_3CF_2CF_2O-(CF_2CF_2O)_m-(CF_2O)_{n1}-(CF_2CF_2CF_2O)_{n2}-$, $CF_3CF_2CF_2O$—$(CF_2CF_2O)_m$—$(CF_2O)_{n1}$—$(CF_2CF_2CF_2O)_{n2}$—$(CF_2CF_2CF_2CF_2O)_{n3}$—, or $CF_3CF_2CF_2O$—$(CF_2CF_2O)_m$—$(CF_2O)_{n1}$—$(CF_2CF_2CF_2O)_{n2}$—$(CF_2CF_2CF_2CF_2O)_{n3}$—$(CF_2CF_2CF_2CF_2O)_{n4}$—, wherein m, n, n1, n2, n3, and n4 are each independently an integer of 1 to 110, m+n is in a range of 2 to 210, m+n1+n2 is in a range of 3 to 310, m+n1+n2+n3 is in a range of 4 to 410, and m+n1+n2+n3+n4 is in a range of 5 to 510.

7. The article of claim 1, wherein the compound represented by Formula 1 is one or more of an ester compound represented by Formulas 5a and 5b,
an anhydride compound represented by Formulas 5c and 5d,
an acrylate compound represented by Formulas 5e and 5f,
a maleate compound represented by Formulas 5g and 5h,
a carbonate compound represented by Formulas 5i and 5j,
an epoxy compound represented by Formulas 5k and 5l, and
a cyclic carbonate compound represented by Formulas 5m and 5n:

$CF_3O$—$(CF_2CF_2O)_m$—$(CF_2O)_n$—$(CR_{12}R_{13})_{p3}$—$C(=O)O$—$R_1$     Formula 5a $CF_3O$—$(CF_2CF_2O)_m$—$(CF_2O)_n$—$(CR_{14}R_{15}CR_{16}R_{17})_{p3}$—$C(=O)O$—$R_1$     Formula 5b $CF_3O$—$(CF_2CF_2O)_m$—$(CF_2O)_n$—$(CR_{12}R_{13})_{p3}$—$C(=O)$—$O$—$C(=O)$—$R_2$     Formula 5c $CF_3O$—$(CF_2CF_2O)_m$—$(CF_2O)_n$—$(CR_{14}R_{15}CR_{16}R_{17})_{p3}$—$C(=O)$—$O$—$C(=O)$—$R_2$     Formula 5d $CF_3O$—$(CF_2CF_2O)_m$—$(CF_2O)_n$—$(CR_{12}R_{13})_{p3}$—$O$—$(C=O)$—$CR_3=CR_4R_5$     Formula 5e $CF_3O$—$(CF_2CF_2O)_m$—$(CF_2O)_n$—$(CR_{14}R_{15}CR_{16}R_{17})_{p3}$—$O$—$(C=O)$—$CR_3=CR_4R_5$     Formula 5f $CF_3O$—$(CF_2CF_2O)_m$—$(CF_2O)_n$—$(CR_{12}R_{13})_{p3}$—$O$—$(C=O)$—$CR_6=CR_7$—$(C=O)$—$O$—$R_8$     Formula 5g $CF_3O$—$(CF_2CF_2O)_m$—$(CF_2O)_n$—$(CR_{14}R_{15}CR_{16}R_{17})_{p3}$—$O$—$(C=O)$—$CR_6=CR_7$—$(C=O)$—$O$—$R_8$     Formula 5h $CF_3O$—$(CF_2CF_2O)_m$—$(CF_2O)_n$—$(CR_{12}R_{13})_{p3}$—$O$—$C(=O)$—$O$—$R_9$     Formula 5i $CF_3O$—$(CF_2CF_2O)_m$—$(CF_2O)_n$—$(CR_{14}R_{15}CR_{16}R_{17})_{p3}$—$O$—$C(=O)$—$O$—$R_9$     Formula 5j $CF_3O$—$(CF_2CF_2O)_m$—$(CF_2O)_n$—$(CR_{12}R_{13})_{p3}$—$R_{10}$     Formula 5k $CF_3O$—$(CF_2CF_2O)_m$—$(CF_2O)_n$—$(CR_{14}R_{15}CR_{16}R_{17})_{p3}$—$R_{10}$     Formula 5l $CF_3O$—$(CF_2CF_2O)_m$—$(CF_2O)_n$—$(CR_{12}R_{13})_{p3}$—$R_{11}$     Formula 5m $CF_3O$—$(CF_2CF_2O)_m$—$(CF_2O)_n$—$(CR_{14}R_{15}CR_{16}R_{17})_{p3}$—$R_{11}$,     Formula 5n wherein, in Formulas 5a to 5n, $R_{10}$ and $R_{11}$ are each independently a hydrogen, a C1 to C5 alkyl group, a fluorine, or a fluorinated C1 to C5 alkyl group, m and n are each independently an integer of 1 to 110, m+n is in a range of 2 to 210, p3 is an integer of 1 to 10, $R_1$, $R_2$, $R_5$, $R_8$, and $R_9$ are each independently a substituted or unsubstituted C1 to C20 alkyl group, or a substituted or unsubstituted C6 to C20 aryl group, $R_3$, $R_4$, $R_6$, $R_7$, $R_{12}$, $R_{13}$, $R_{14}$, $R_{15}$, $R_{16}$, and $R_{17}$ are each independently a hydrogen, a halogen atom, a hydroxy group, a substituted or unsubstituted C1 to C20 alkyl group, or a substituted or unsubstituted C6 to C20 aryl group, $R_{10}$ is

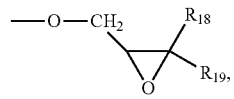

$R_{11}$ is

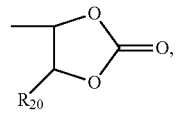

and $R_{18}$, $R_{19}$, and $R_{20}$ are each independently a hydrogen, a halogen atom, a hydroxy group, a substituted or unsubstituted C1 to C20 alkyl group, or a substituted or unsubstituted C6 to C20 aryl group.

8. The article of claim 1, wherein the compound represented by Formula 1 comprises:

$CF_3O$—$(CF_2CF_2O)_m$—$(CF_2O)_n$—$(CF_2)_{p3}$—$C(=O)O$—$CH_3$, $CF_3O$—$(CF_2CF_2O)_m$—$(CF_2O)_n$—$(CF_2)_{p3}$—$C(=O)O$—$CH_2CH_3$, $CF_3O$—$(CF_2CF_2O)_m$—$(CF_2O)_n$—$(CF_2)_{p3}$—$C(=O)O$—$CH_2CH_2CH_3$, $CF_3O$—$(CF_2CF_2O)_m$—$(CF_2O)_n$—$(CF_2CH_2)_{p3}$—$C(=O)O$—$CH_3$, $CF_3O$—$(CF_2CF_2O)_m$—$(CF_2O)_n$—$(CF_2CH_2)_{p3}$—$C(=O)O$—$CH_2CH_3$, $CF_3O$—$(CF_2CF_2O)_m$—$(CF_2O)_n$—$(CF_2CH_2)_{p3}$—$C(=O)O$—$CH_2CH_2CH_3$, $CF_3O$—$(CF_2CF_2O)_m$—$(CF_2O)_n$—$(CH_2)_{p3}$—$C(=O)O$—$CH_3$, $CF_3O$—$(CF_2CF_2O)_m$—$(CF_2O)_n$—$(CH_2)_{p3}$—$C(=O)O$—$CH_2CH_3$, $CF_3O$—$(CF_2CF_2O)_m$—$(CF_2O)_n$—$(CH_2)_{p3}$—$C(=O)O$—$CH_2CH_2CH_3$, $CF_3O$—$(CF_2CF_2O)_m$—$(CF_2O)_n$—$(CF_2)_{p3}$—$C(=O)$—$O$—$C(=O)$—$CH_3$, $CF_3O$—$(CF_2CF_2O)_m$—$(CF_2O)_n$—$(CF_2)_{p3}$—$C(=O)$—$O$—$C(=O)$—$CH_2CH_3$, $CF_3O$—$(CF_2CF_2O)_m$—$(CF_2O)_n$—$(CF_2)_{p3}$—$C(=O)$—$O$—$C(=O)$—$CH_2CH_2CH_3$, $CF_3O$—$(CF_2CF_2O)_m$—$(CF_2O)_n$—$(CF_2CH_2)_{p3}$—$C(=O)$—$O$—$C(=O)$—$CH_3$, $CF_3O$—$(CF_2CF_2O)_m$—$(CF_2O)_n$—$(CF_2CH_2)_{p3}$—$C(=O)$—$O$—$C(=O)$—$CH_2CH_3$, $CF_3O$—$(CF_2CF_2O)_m$—$(CF_2O)_n$—$(CF_2CH_2)_{p3}$—$C(=O)$—$O$—$C(=O)$—$CH_2CH_2CH_3$, $CF_3O$—$(CF_2CF_2O)_m$—$(CF_2O)_n$—$(CH_2)_{p3}$—$C(=O)$—$O$—$C(=O)$—$CH_3$, $CF_3O$—$(CF_2CF_2O)_m$—$(CF_2O)_n$—$(CH_2)_{p3}$—$C(=O)$—$O$—$C(=O)$—$CH_2CH_3$, $CF_3O$—$(CF_2CF_2O)_m$—$(CF_2O)_n$—$(CH_2)_{p3}$—$C(=O)$—$O$—$C(=O)$—$CH_2CH_2CH_3$, $CF_3O$—$(CF_2CF_2O)_m$—$(CF_2O)_n$—$(CF_2)_{p3}$—$O$—$(C=O)$—$CH=CH_2$, $CF_3O\text{—}(CF_2CF_2O)_m\text{—}(CF_2O)_n\text{—}(CF_2)_{p3}\text{—}O\text{—}(C{=}O)\text{—}C(CH_3){=}CH_2$, $CF_3O\text{—}(CF_2CF_2O)_m\text{—}(CF_2O)_n\text{—}(CF_2)_{p3}\text{—}O\text{—}(C{=}O)\text{—}CH{=}CHCH_3$, $CF_3O\text{—}(CF_2CF_2O)_m\text{—}(CF_2O)_n\text{—}(CF_2CH_2)_{p3}\text{—}O\text{—}(C{=}O)\text{—}CH{=}CH_2$, $CF_3O\text{—}(CF_2CF_2O)_m\text{—}(CF_2O)_n\text{—}(CF_2CH_2)_{p3}\text{—}O\text{—}(C{=}O)\text{—}C(CH_3){=}CH_2$, $CF_3O\text{—}(CF_2CF_2O)_m\text{—}(CF_2O)_n\text{—}(CF_2CH_2)_{p3}\text{—}O\text{—}(C{=}O)\text{—}CH{=}CHCH_3$, $CF_3O\text{—}(CF_2CF_2O)_m\text{—}(CF_2O)_n\text{—}(CH_2)_{p3}\text{—}O\text{—}(C{=}O)\text{—}CH{=}CH_2$, $CF_3O\text{—}(CF_2CF_2O)_m\text{—}(CF_2O)_n\text{—}(CH_2)_{p3}\text{—}O\text{—}(C{=}O)\text{—}C(CH_3){=}CH_2$, $CF_3O\text{—}(CF_2CF_2O)_m\text{—}(CF_2O)_n\text{—}(CH_2)_{p3}\text{—}O\text{—}(C{=}O)\text{—}CH{=}CHCH_3$, $CF_3O\text{—}(CF_2CF_2O)_m\text{—}(CF_2O)_n\text{—}(CF_2)_{p3}\text{—}O\text{—}(C{=}O)\text{—}CH{=}CH\text{—}(C{=}O)\text{—}O\text{—}CH_3$, $CF_3O\text{—}(CF_2CF_2O)_m\text{—}(CF_2O)_n\text{—}(CF_2)_{p3}\text{—}O\text{—}(C{=}O)\text{—}CH{=}CH\text{—}(C{=}O)\text{—}O\text{—}CH_2CH_3$, $CF_3O\text{—}(CF_2CF_2O)_m\text{—}(CF_2O)_n\text{—}(CF_2)_{p3}\text{—}O\text{—}(C{=}O)\text{—}CH{=}CH\text{—}(C{=}O)\text{—}O\text{—}CH_2CH_2CH_3$, $CF_3O\text{—}(CF_2CF_2O)_m\text{—}(CF_2O)_n\text{—}(CF_2CH_2)_{p3}\text{—}O\text{—}(C{=}O)\text{—}CH{=}CH\text{—}(C{=}O)\text{—}O\text{—}CH_3$, $CF_3O\text{—}(CF_2CF_2O)_m\text{—}(CF_2O)_n\text{—}(CF_2CH_2)_{p3}\text{—}O\text{—}(C{=}O)\text{—}CH{=}CH\text{—}(C{=}O)\text{—}O\text{—}CH_2CH_3$, $CF_3O\text{—}(CF_2CF_2O)_m\text{—}(CF_2O)_n\text{—}(CF_2CH_2)_{p3}\text{—}O\text{—}(C{=}O)\text{—}CH{=}CH\text{—}(C{=}O)\text{—}O\text{—}CH_2CH_2CH_3$, $CF_3O\text{—}(CF_2CF_2O)_m\text{—}(CF_2O)_n\text{—}(CH_2)_{p3}\text{—}O\text{—}(C{=}O)\text{—}CH{=}CH\text{—}(C{=}O)\text{—}O\text{—}CH_3$, $CF_3O\text{—}(CF_2CF_2O)_m\text{—}(CF_2O)_n\text{—}(CH_2)_{p3}\text{—}O\text{—}(C{=}O)\text{—}CH{=}CH\text{—}(C{=}O)\text{—}O\text{—}CH_2CH_3$, $CF_3O\text{—}(CF_2CF_2O)_m\text{—}(CF_2O)_n\text{—}(CH_2)_{p3}\text{—}O\text{—}(C{=}O)\text{—}CH{=}CH\text{—}(C{=}O)\text{—}O\text{—}CH_2CH_2CH_3$, $CF_3O\text{—}(CF_2CF_2O)_m\text{—}(CF_2O)_n\text{—}(CF_2)_{p3}\text{—}O\text{—}C({=}O)\text{—}O\text{—}CH_3$, $CF_3O\text{—}(CF_2CF_2O)_m\text{—}(CF_2O)_n\text{—}(CF_2)_{p3}\text{—}O\text{—}C({=}O)\text{—}O\text{—}CH_2CH_3$, $CF_3O\text{—}(CF_2CF_2O)_m\text{—}(CF_2O)_n\text{—}(CF_2)_{p3}\text{—}O\text{—}C({=}O)\text{—}O\text{—}CH_2CH_2CH_3$, $CF_3O\text{—}(CF_2CF_2O)_m\text{—}(CF_2O)_n\text{—}(CF_2CH_2)_{p3}\text{—}O\text{—}C({=}O)\text{—}O\text{—}CH_3$, $CF_3O\text{—}(CF_2CF_2O)_m\text{—}(CF_2O)_n\text{—}(CF_2CH_2)_{p3}\text{—}O\text{—}C({=}O)\text{—}O\text{—}CH_2CH_3$, $CF_3O\text{—}(CF_2CF_2O)_m\text{—}(CF_2CH_2O)_n\text{—}(CF_2)_{p3}\text{—}O\text{—}C({=}O)\text{—}O\text{—}CH_2CH_3$, $CF_3O\text{—}(CF_2CF_2O)_m\text{—}(CF_2O)_n\text{—}(CH_2)_{p3}\text{—}O\text{—}C({=}O)\text{—}O\text{—}CH_3$, $CF_3O\text{—}(CF_2CF_2O)_m\text{—}(CF_2O)_n\text{—}(CH_2)_{p3}\text{—}O\text{—}C({=}O)\text{—}O\text{—}CH_2CH_3$, $CF_3O\text{—}(CF_2CF_2O)_m\text{—}(CH_2O)_n\text{—}(CF_2)_{p3}\text{—}O\text{—}C({=}O)\text{—}O\text{—}CH_2CH_2CH_3$,

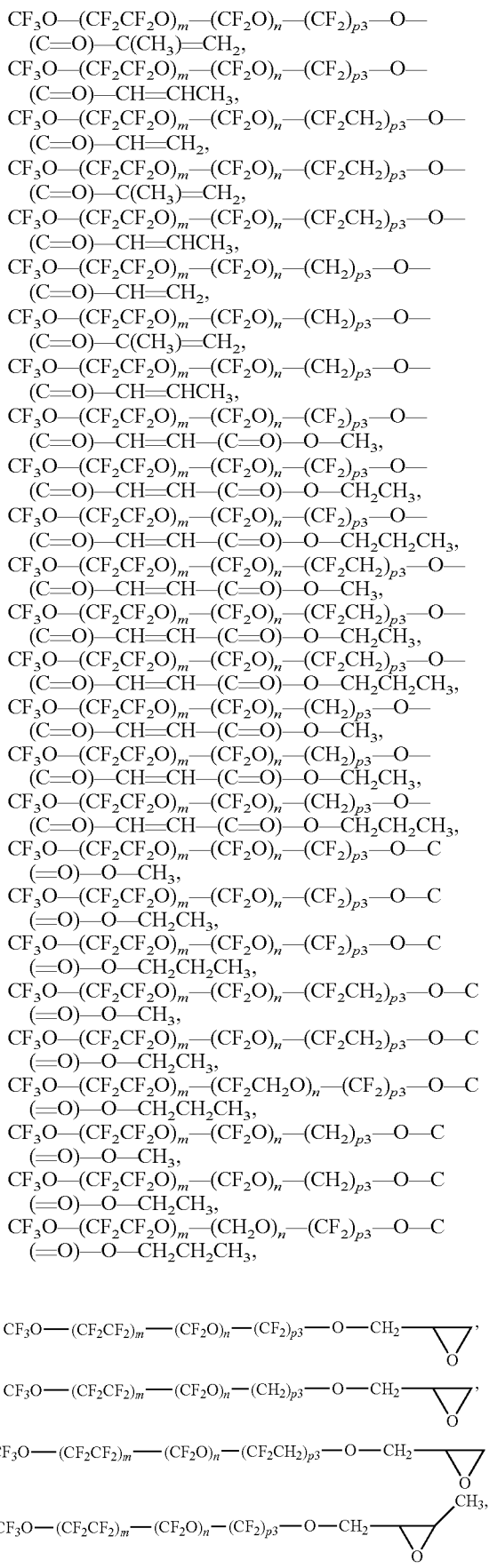

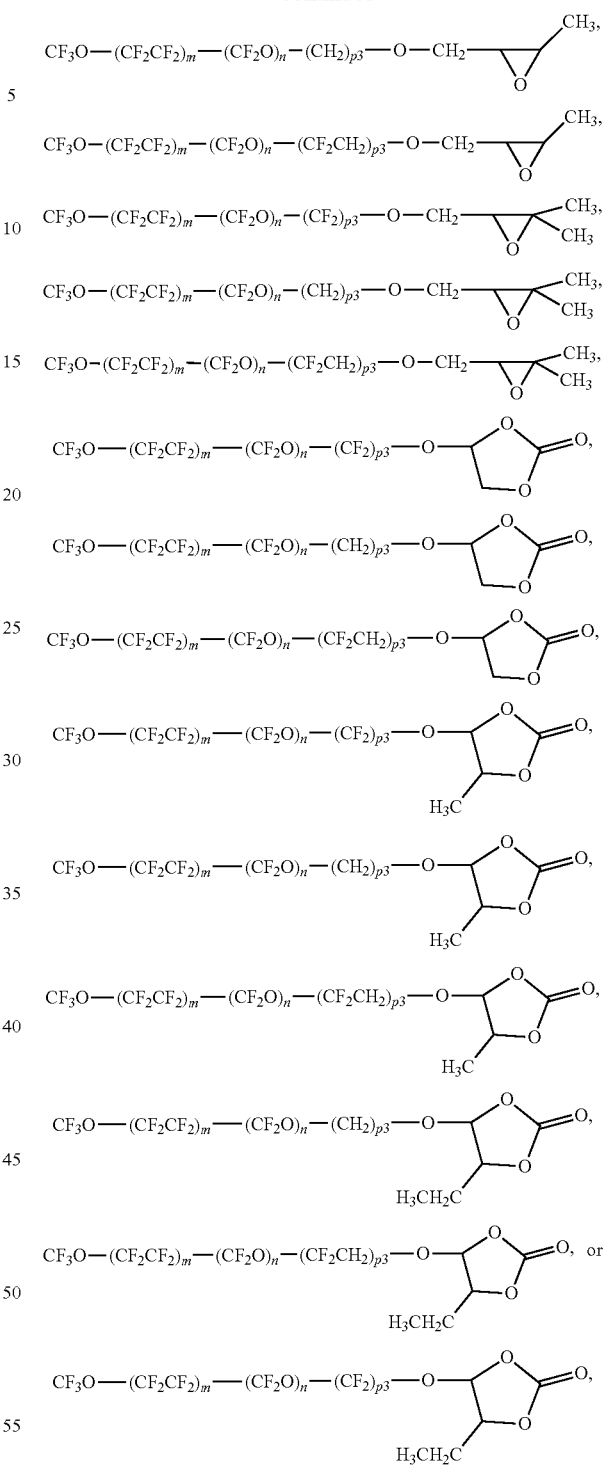

wherein m and n are each independently an integer of 1 to 110, m+n is in a range of 2 to 210, and p3 is an integer of 1 to 10.

9. The article of claim 1, wherein the compound represented by Formula 2 or Formula 3 is a compound represented by one of Formulas 6 to 8:

Formula 6

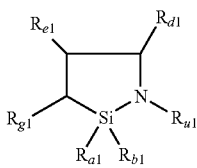

Formula 7

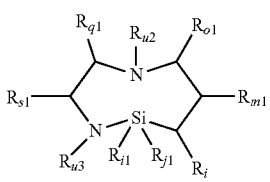

Formula 8

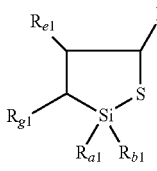

wherein, in Formulas 6 to 8, $R_{a1}$, $R_{b1}$, $R_{i1}$, and $R_{j1}$ are each independently a substituted or unsubstituted C1 to C20 alkoxy group, a substituted or unsubstituted C1 to C20 alkyl group, or a hydroxy group, and $R_{d1}$, $R_{e1}$, $R_{g1}$, $R_i$, $R_{m1}$, $R_{o1}$, $R_{q1}$, $R_{s1}$, $R_{u1}$, $R_{u2}$, and $R_{u3}$ are each independently a hydrogen, a substituted or unsubstituted C1 to C20 alkyl group, or a substituted or unsubstituted C2 to C20 alkenyl group.

10. The article of claim 1, wherein the compound represented by Formula 2 or Formula 3 is a compound represented by one of Formulas 9 to 11:

Formula 9

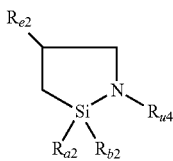

Formula 10

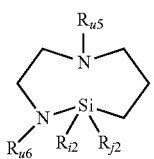

Formula 11

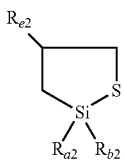

wherein, in Formulas 9 to 11, $R_{a2}$, $R_{b2}$, $R_{i2}$, and $R_{j2}$ are each independently a substituted or unsubstituted C1 to C20 alkoxy group, or a substituted or unsubstituted C1 to C20 alkyl group, and $R_{e2}$, $R_{u4}$, $R_{u5}$, and $R_{u6}$ are each independently a hydrogen, a substituted or unsubstituted C1 to C20 alkyl group, or a substituted or unsubstituted C2 to C20 alkenyl group.

11. The article of claim 1, wherein the compound represented by Formula 2 or Formula 3 is a compound represented by one of Formulas 12a to 12n:

Formula 12a

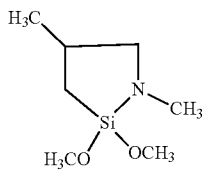

Formula 12b

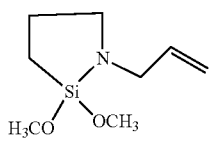

Formula 12c

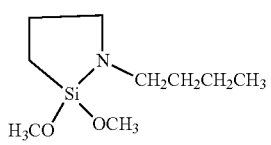

Formula 12d

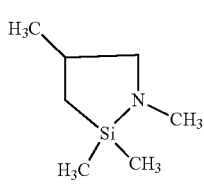

Formula 12e

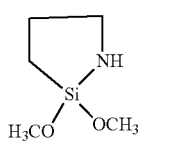

Formula 12f

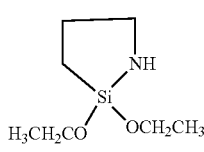

Formula 12g

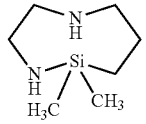

Formula 12h

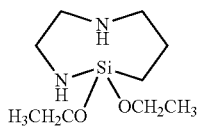

Formula 12i

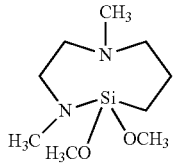

-continued

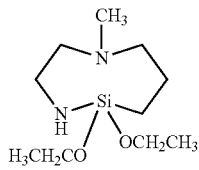
Formula 12j

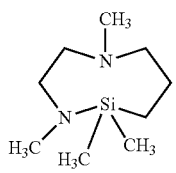
Formula 12k

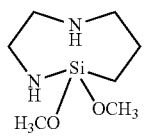
Formula 12l

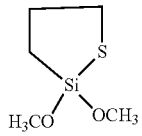
Formula 12m

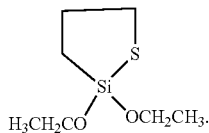
Formula 12n

12. The article of claim 1, wherein the compound represented by Formula 1 comprises a fluorine-containing (poly) ether group having a weight-average molecular weight of 1,000 grams per mole to 20,000 grams per mole.

13. The article of claim 1, wherein a mixing molar ratio of the compound represented by Formula 1 and the compound represented by Formula 2 or Formula 3 is about 1:0.5 to about 1:10.

14. The article of claim 1, wherein the material has a contact angle of about 100° or greater measured by a Sessile drop method at 25° C.

15. The article of claim 1, wherein the material has a shape of a film, a coating or a layer.

16. An electronic device comprising a material comprising
a ring-opening reaction product of a cyclic silane represented by Formula 2 or Formula 3, and a fluorine-containing (poly)ether group represnted by Formula 1,
a polycondensation product of a ring-opening reaction product of a compound represented by Formula 2 or Formula 3, and a compound having a fluorine-containing (poly)ether grop represented by Formula 1,
or a combination thereof

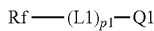
Formula 1

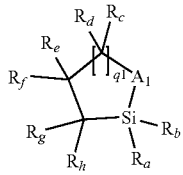
Formula 2

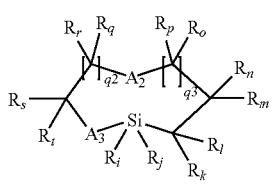
Formula 3 wherein, in Formulas 1 to 3,
Rf is a fluorine-containing (poly)ether group,
L1 is a substituted or unsubstituted C1 to C20 alkylene group, a substituted or unsubstituted C1 to C20 oxyalkylene group, or a combination thereof,
Q1 is —C(=O)O—$R_1$, —C(=O)—O—C(=O)—$R_2$, —O—(C=O)—$CR_3$=$CR_4R_5$, —O—(C=O)—$CR_6$=$CR_7$—(C=O)—O—$R_8$, —O—C(=O)—O—$R_9$, an epoxy-containing group, or a cyclic carbonate-containing group,
p1 is an integer of 1 to 10,
q1, q2, and q3 are each independently an integer of 1 to 10,
A1, A2, and A3 are each independently =N—$R_u$ or —S—,
$R_1$, $R_2$, $R_5$, $R_8$, and $R_9$ are each independently a substituted or unsubstituted C1 to C20 alkyl group, or a substituted or unsubstituted C6 to C20 aryl group,
$R_3$, $R_4$, $R_6$, and $R_7$ are each independently a hydrogen, a halogen atom, a hydroxy group, a substituted or unsubstituted C1 to C20 alkyl group, or a substituted or unsubstituted C6 to C20 aryl group,
$R_a$, $R_b$, $R_i$, and $R_j$ are each independently a substituted or unsubstituted C1 to C20 alkoxy group, a substituted or unsubstituted C1 to C20 alkyl group, a substituted or unsubstituted C6 to C20 aryl group, a halogen, or a hydroxy group, and
$R_c$, $R_d$, $R_e$, $R_f$, $R_g$, $R_h$, $R_k$, $R_l$, $R_m$, $R_n$, $R_o$, $R_p$, $R_q$, $R_r$, $R_s$, $R_t$, and $R_u$ are each independently a hydrogen, a substituted or unsubstituted C1 to C20 alkyl group, a substituted or unsubstituted C6 to C20 aryl group, or a substituted or unsubstituted C2 to C20 alkenyl group.

17. The electronic device of claim 16, wherein
the material is disposed on a surface of the electronic device.

18. The electronic device of claim 16, wherein the electronic device comprises a display panel, and
the material is disposed on a surface of the display panel.

19. The article of claim 1, wherein the material has a thickness of 1 micrometer or less.

* * * * *